(12) United States Patent
Francini et al.

(10) Patent No.: US 11,240,169 B2
(45) Date of Patent: Feb. 1, 2022

(54) PACKET QUEUING

(71) Applicant: NOKIA SOLUTIONS AND NETWORKS OY, Espoo (FI)

(72) Inventors: Andrea Francini, Rumson, NJ (US); Sameerkumar Sharma, Holmdel, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 301 days.

(21) Appl. No.: 16/051,097

(22) Filed: Jul. 31, 2018

(65) Prior Publication Data

US 2020/0044980 A1    Feb. 6, 2020

(51) Int. Cl.
| | |
|---|---|
| *H04L 12/863* | (2013.01) |
| *H04L 12/801* | (2013.01) |
| *H04L 12/743* | (2013.01) |
| *H04L 12/879* | (2013.01) |

(52) U.S. Cl.
CPC ...... *H04L 47/6225* (2013.01); *H04L 45/7453* (2013.01); *H04L 47/10* (2013.01); *H04L 47/6215* (2013.01); *H04L 49/901* (2013.01)

(58) Field of Classification Search
CPC . H04L 47/6225; H04L 47/10; H04L 47/6215; H04L 45/7453; H04L 49/901
USPC .......................................................... 370/412
See application file for complete search history.

(56) References Cited

U.S. PATENT DOCUMENTS

| | | | | |
|---|---|---|---|---|
| 7,302,377 | B1 * | 11/2007 | Deepak ................... | G06F 30/33 703/14 |
| 9,374,325 | B2 * | 6/2016 | McKenney ........... | G06F 3/0611 |
| 2016/0323172 | A1 * | 11/2016 | Friend ................... | H04L 43/028 |
| 2019/0289033 | A1 * | 9/2019 | Pan ....................... | H04L 63/0272 |
| 2020/0036636 | A1 * | 1/2020 | Holla .................. | H04L 47/6215 |

OTHER PUBLICATIONS

P. McKenney, "Stochastic Fairness Queuing," Proceedings of IEEE Infocom 1990, San Francisco (CA), Jun. 1990, pp. 733-740.

(Continued)

*Primary Examiner* — Chi Tang P Cheng
(74) *Attorney, Agent, or Firm* — Tong, Rea, Bentley & Kim, LLC

(57) ABSTRACT

Various example embodiments relate generally to supporting queuing of packets in a communication network. Various example embodiments for supporting queuing of packets in a communication network may be configured to support queueing of packets based on a packet queuing memory space including a hash entry space configured to maintain a set of H hash entries and a packet queue space configured to maintain a set of Q packet queues, wherein H is greater than Q. Various example embodiments for supporting queuing of packets in a communication network may be configured to support queueing of packets in a manner for handling packet events (e.g., packet arrival events, packet departure events, or the like) while preventing or mitigating queue collisions of hash entries (where a queue collision occurs when multiple hash entries, and the respective network flows of those hash entries, are associated with a single packet queue).

25 Claims, 9 Drawing Sheets

(56) References Cited

OTHER PUBLICATIONS

R. Kumar, A. Francini, S. Panwar, S. Sharma, "Dynamic Control of RLC Buffer Size for Latency Minimization in Mobile RAN," Proceedings of IEEE WCNC 2018, Barcelona, Spain, Apr. 2018, 6 pages.
W. Chen, F. Ren, J. Xie, C. Lin, K. Yin, and F. Baker, "Comprehensive Understanding of TCP Incast Problem," Proceedings of IEEE Infocom 2015, Hong Kong, Apr. 2015, pp. 1688-1696.
A. M. Abdelmoniemand, B. Bensaou, "Reconciling Mice and Elephants in Data Center Networks," Proceedings of IEEE CloudNet 2015, Vancouver, CA, Oct. 2015, 7 pages.
T. Hoeiland-Joergensen, P. McKenney, D. Taht, J. Gettys, E. Dumazet, "The Flow Queue CoDel Packet Scheduler and Active Queue Management Algorithm," IETF RFC 8290, Jan. 2018, 25 pages.
K. Nichols, V. Jacobson, "Controlling Queue Delay," ACM Queue, vol. 10, Issue 5, May 2012, 15 pages.
bufferbloat.net, "Cake—Common Applications Kept Enhanced," downloaded from http://www.bufferbloat.net/projects/codel/wiki/Cake, Oct. 30, 2018, 13 pages.
C. Hu, Y. Tang, X. Chen, B. Liu, "Per-Flow Queueing by Dynamic Queue Sharing," Proceedings of IEEE Infocom 2007, Barcelona, Spain, May 2007, pp. 1613-1621.

\* cited by examiner

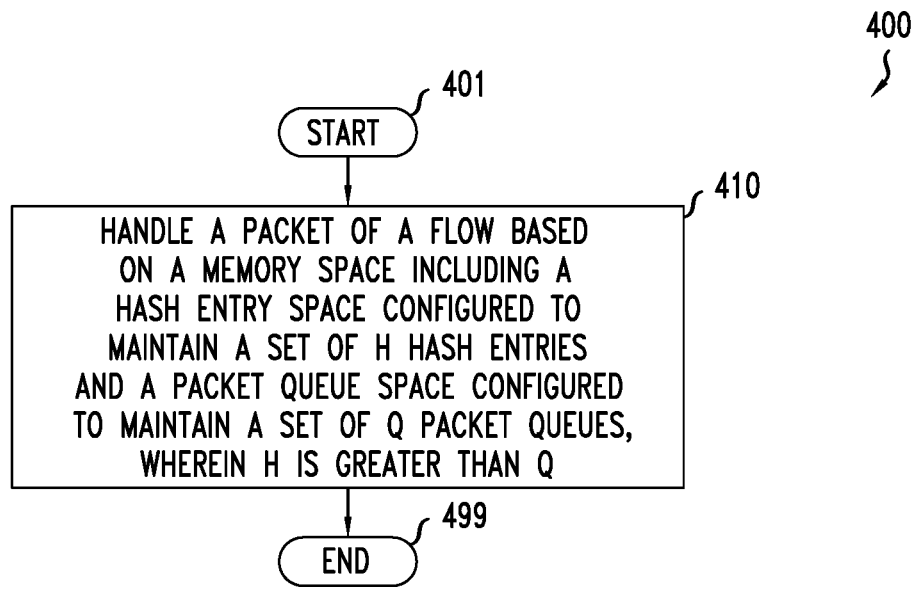
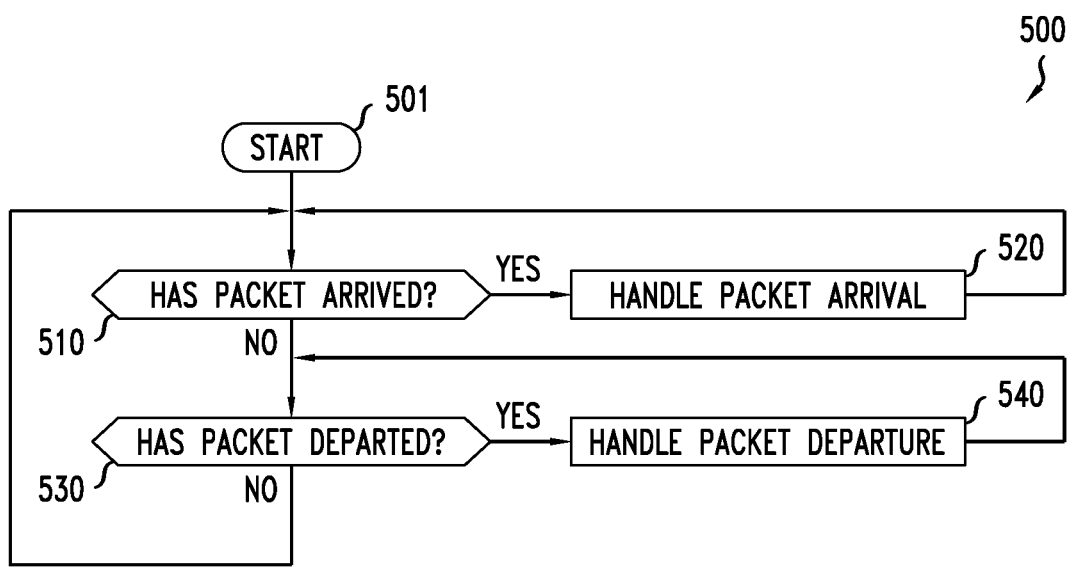

PACKET QUEUING

TECHNICAL FIELD

The present disclosure relates generally to communication networks and, more particularly but not exclusively, to supporting queuing of packets in communication networks.

BACKGROUND

In many communication networks, various communications technologies may be used to support communications.

SUMMARY

Various example embodiments relate generally to supporting queuing of packets in a communication network.

In at least some example embodiments, an apparatus includes at least one processor and at least one memory including computer program code, wherein the at least one memory and the computer program code are configured to, with the at least one processor, cause the apparatus to at least handle a packet of a flow based on a packet queuing memory space including a hash entry space configured to maintain a set of H hash entries and a packet queue space configured to maintain a set of Q packet queues, wherein H is greater than Q. In at least some example embodiments, only a subset of the hash entries in the hash entry space point to ones of the packet queues in the packet queue space. In at least some example embodiments, when one of the hash entries is associated with a packet queue in the packet queue space that is left empty by departure of the packet, the one of the hash entries becomes empty. In at least some example embodiments, the packet is handled based on a hash function configured to hash the packet into one of the hash entries of the hash entry space. In at least some example embodiments, at least a portion of the packet queues of the packet queue space are pointed to by ones of the hash entries of the hash entry space. In at least some example embodiments, when one of the packet queues has at least one packet queued, the hash entry associated with the one of the packet queues includes a pointer to the one of the packet queues. In at least some example embodiments, the packet is handled based on a scheduler configured to service ones of the packet queues with at least one packet queued. In at least some example embodiments, the ones of the packet queues with at least one packet queued are maintained as a linked list. In at least some example embodiments, the scheduler is a round robin scheduler. In at least some example embodiments, the scheduler maintains a set of available packet queues comprising ones of the packet queues of the packet queue space that are empty. In at least some example embodiments, the set of available packet queues is maintained using a last-in-first-out (LIFO) queue. In at least some example embodiments, the scheduler is configured to transition ones of the packet queues between being associated with the scheduler and being included in the set of available packet queues based on packet events. In at least some example embodiments, the at least one memory and the computer program code are configured to, with the at least one processor, cause the apparatus to at least identify, from the hash entry space, a hash entry associated with the packet, and, based on a determination that the hash entry includes a pointer to one of the packet queues, add the packet to the one of the packet queues. In at least some example embodiments, the at least one memory and the computer program code are configured to, with the at least one processor, cause the apparatus to at least identify, from the hash entry space, a hash entry associated with the packet, and, based on a determination that the hash entry is empty, drop the packet based on a determination that an available packet queue is not available in the packet queue space. In at least some example embodiments, the at least one memory and the computer program code are configured to, with the at least one processor, cause the apparatus to at least identify, from the hash entry space, a hash entry associated with the packet, determine, based on a determination that the hash entry is empty, whether an available packet queue is available in the packet queue space, and, based on a determination that an available packet queue is available in the packet queue space: append the available packet queue to a tail packet queue in a list of active packet queues associated with a scheduler, advance a round robin tail pointer of the scheduler to the available packet queue in the list of active packet queues associated with the scheduler, set the hash entry to point to the available packet queue in the list of active packet queues associated with the scheduler, and enqueue the packet and increment a packet counter of the available packet queue. In at least some example embodiments, the at least one memory and the computer program code are configured to, with the at least one processor, cause the apparatus to at least update a packet counter of a packet queue of the packet, and, based on a determination that the packet counter of the packet queue of the packet is indicative that the packet queue is not empty, advance a round robin tail pointer of a scheduler to the packet queue of the packet. In at least some example embodiments, the at least one memory and the computer program code are configured to, with the at least one processor, cause the apparatus to at least update a packet counter of a packet queue of the packet, and, based on a determination that the packet counter of the packet queue of the packet is indicative that the packet queue is empty: identify a hash entry associated with the packet queue of the packet, reset the hash entry associated with the packet queue of the packet, and move the packet queue of the packet from a list of active packet queues associated with a scheduler to the set of available packet queues associated with the scheduler. In at least some example embodiments, the at least one memory and the computer program code are configured to, with the at least one processor, cause the apparatus to at least identify, from the hash entry space, a hash entry associated with the packet, and, based on a determination that the hash entry includes a pointer to one of the packet queues: enqueue the packet, increment a packet counter of a packet queue of the packet, and increment a packet counter of the hash entry associated with the packet. In at least some example embodiments, the at least one memory and the computer program code are configured to, with the at least one processor, cause the apparatus to at least identify, from the hash entry space, a hash entry associated with the packet, based on a determination that the hash entry is empty, determine whether an available packet queue is available in the packet queue space, and, based on a determination that an available packet queue is not available in the packet queue space: set the hash entry associated with the packet to a next packet queue of a set of active packet queues associated with a scheduler, increment a hash entry counter of the next packet queue, enqueue the packet, increment a packet counter of the next packet queue, and increment a packet counter of the hash entry associated with the packet. In at least some example embodiments, the at least one memory and the computer program code are configured to, with the at least one processor, cause the apparatus to at least identify, from the hash entry space, a hash entry associated with the packet, based on a determination that the hash entry is empty, determine whether an available packet queue is available in the packet queue space, and, based on a determination that an available packet queue is available in the packet queue space: append the available packet queue to a tail packet queue in a list of active packet queues associated with a scheduler, advance a round robin tail pointer of the scheduler to the available packet queue in the list of active packet queues associated with the scheduler, set the hash entry to point to the available packet queue in the list of active packet queues associated with the scheduler, increment a hash entry counter of the available packet queue, enqueue the packet and increment a packet counter of the available packet queue, and increment a packet counter of the hash entry associated with the packet. In at least some example embodiments, the at least one memory and the computer program code are configured to, with the at least one processor, cause the apparatus to at least identify, from the hash entry space, a hash entry associated with the packet, update a packet counter of a packet queue of the packet and a packet counter of the hash entry associated with the packet, and, based on a determination that the packet counter of the hash entry associated with the packet is indicative that the hash entry associated with the packet is not empty, advance a round robin tail pointer of a scheduler to the packet queue of the packet. In at least some example embodiments, the at least one memory and the computer program code are configured to, with the at least one processor, cause the apparatus to at least identify, from the hash entry space, a hash entry associated with the packet, update a packet counter of a packet queue of the packet and a packet counter of the hash entry associated with the packet, and based on a determination that the packet counter of the hash entry associated with the packet is indicative that the hash entry associated with the packet is empty: reset a queue pointer in the hash entry associated with the packet, update a hash entry counter of the packet queue of the packet, and based on a determination the flow counter of the packet queue of the packet is indicative that the packet queue of the packet is not empty, advance a round robin tail pointer of a scheduler to the packet queue of the packet. In at least some example embodiments, the at least one memory and the computer program code are configured to, with the at least one processor, cause the apparatus to at least identify, from the hash entry space, a hash entry associated with the packet, update a packet counter of a packet queue of the packet and a packet counter of the hash entry associated with the packet, and, based on a determination that the packet counter of the hash entry associated with the packet is indicative that the hash entry associated with the packet is empty: reset a queue pointer in the hash entry associated with the packet, update a hash entry counter of the packet queue of the packet, and, based on a determination that the hash entry counter of the packet queue of the packet is indicative that the packet queue of the packet is empty, move the packet queue of the packet from a list of active packet queues associated with a scheduler to a set of available packet queues associated with the scheduler.

In at least some example embodiments, a non-transitory computer readable medium includes program instructions for causing an apparatus to at least handle a packet of a flow based on a packet queuing memory space including a hash entry space configured to maintain a set of H hash entries and a packet queue space configured to maintain a set of Q packet queues, wherein H is greater than Q. In at least some example embodiments, only a subset of the hash entries in the hash entry space point to ones of the packet queues in the packet queue space. In at least some example embodiments, when one of the hash entries is associated with a packet queue in the packet queue space that is left empty by departure of the packet, the one of the hash entries becomes empty. In at least some example embodiments, the packet is handled based on a hash function configured to hash the packet into one of the hash entries of the hash entry space. In at least some example embodiments, at least a portion of the packet queues of the packet queue space are pointed to by ones of the hash entries of the hash entry space. In at least some example embodiments, when one of the packet queues has at least one packet queued, the hash entry associated with the one of the packet queues includes a pointer to the one of the packet queues. In at least some example embodiments, the packet is handled based on a scheduler configured to service ones of the packet queues with at least one packet queued. In at least some example embodiments, the ones of the packet queues with at least one packet queued are maintained as a linked list. In at least some example embodiments, the scheduler is a round robin scheduler. In at least some example embodiments, the scheduler maintains a set of available packet queues comprising ones of the packet queues of the packet queue space that are empty. In at least some example embodiments, the set of available packet queues is maintained using a last-in-first-out (LIFO) queue. In at least some example embodiments, the scheduler is configured to transition ones of the packet queues between being associated with the scheduler and being included in the set of available packet queues based on packet events. In at least some example embodiments, the non-transitory computer readable medium includes program instructions for causing the apparatus to at least identify, from the hash entry space, a hash entry associated with the packet, and, based on a determination that the hash entry includes a pointer to one of the packet queues, add the packet to the one of the packet queues. In at least some example embodiments, the non-transitory computer readable medium includes program instructions for causing the apparatus to at least identify, from the hash entry space, a hash entry associated with the packet, and, based on a determination that the hash entry is empty, drop the packet based on a determination that an available packet queue is not available in the packet queue space. In at least some example embodiments, the non-transitory computer readable medium includes program instructions for causing the apparatus to at least identify, from the hash entry space, a hash entry associated with the packet, determine, based on a determination that the hash entry is empty, whether an available packet queue is available in the packet queue space, and, based on a determination that an available packet queue is available in the packet queue space: append the available packet queue to a tail packet queue in a list of active packet queues associated with a scheduler, advance a round robin tail pointer of the scheduler to the available packet queue in the list of active packet queues associated with the scheduler, set the hash entry to point to the available packet queue in the list of active packet queues associated with the scheduler, and enqueue the packet and increment a packet counter of the available packet queue. In at least some example embodiments, the non-transitory computer readable medium includes program instructions for causing the apparatus to at least update a packet counter of a packet queue of the packet, and, based on a determination that the packet counter of the packet queue of the packet is indicative that the packet queue is not empty, advance a round robin tail pointer of a scheduler to the packet queue of the packet. In at least some example embodiments, the non-transitory computer readable medium includes program instructions for causing the apparatus to at least update a packet counter of a packet queue of the packet, and, based on a determination that the packet counter of the packet queue of the packet is indicative that the packet queue is empty: identify a hash entry associated with the packet queue of the packet, reset the hash entry associated with the packet queue of the packet, and move the packet queue of the packet from a list of active packet queues associated with a scheduler to the set of available packet queues associated with the scheduler. In at least some example embodiments, the non-transitory computer readable medium includes program instructions for causing the apparatus to at least identify, from the hash entry space, a hash entry associated with the packet, and, based on a determination that the hash entry includes a pointer to one of the packet queues: enqueue the packet, increment a packet counter of a packet queue of the packet, and increment a packet counter of the hash entry associated with the packet. In at least some example embodiments, the non-transitory computer readable medium includes program instructions for causing the apparatus to at least identify, from the hash entry space, a hash entry associated with the packet, based on a determination that the hash entry is empty, determine whether an available packet queue is available in the packet queue space, and, based on a determination that an available packet queue is not available in the packet queue space: set the hash entry associated with the packet to a next packet queue of a set of active packet queues associated with a scheduler, increment a hash entry counter of the next packet queue, enqueue the packet, increment a packet counter of the next packet queue, and increment a packet counter of the hash entry associated with the packet. In at least some example embodiments, the non-transitory computer readable medium includes program instructions for causing the apparatus to at least identify, from the hash entry space, a hash entry associated with the packet, based on a determination that the hash entry is empty, determine whether an available packet queue is available in the packet queue space, and, based on a determination that an available packet queue is available in the packet queue space: append the available packet queue to a tail packet queue in a list of active packet queues associated with a scheduler, advance a round robin tail pointer of the scheduler to the available packet queue in the list of active packet queues associated with the scheduler, set the hash entry to point to the available packet queue in the list of active packet queues associated with the scheduler, increment a hash entry counter of the available packet queue, enqueue the packet and increment a packet counter of the available packet queue, and increment a packet counter of the hash entry associated with the packet. In at least some example embodiments, the non-transitory computer readable medium includes program instructions for causing the apparatus to at least identify, from the hash entry space, a hash entry associated with the packet, update a packet counter of a packet queue of the packet and a packet counter of the hash entry associated with the packet, and, based on a determination that the packet counter of the hash entry associated with the packet is indicative that the hash entry associated with the packet is not empty, advance a round robin tail pointer of a scheduler to the packet queue of the packet. In at least some example embodiments, the non-transitory computer readable medium includes program instructions for causing the apparatus to at least identify, from the hash entry space, a hash entry associated with the packet, update a packet counter of a packet queue of the packet and a packet counter of the hash entry associated with the packet, and based on a determination that the packet counter of the hash entry associated with the packet is indicative that the hash entry associated with the packet is empty: reset a queue pointer in the hash entry associated with the packet, update a hash entry counter of the packet queue of the packet, and based on a determination the flow counter of the packet queue of the packet is indicative that the packet queue of the packet is not empty, advance a round robin tail pointer of a scheduler to the packet queue of the packet. In at least some example embodiments, the non-transitory computer readable medium includes program instructions for causing the apparatus to at least identify, from the hash entry space, a hash entry associated with the packet, update a packet counter of a packet queue of the packet and a packet counter of the hash entry associated with the packet, and, based on a determination that the packet counter of the hash entry associated with the packet is indicative that the hash entry associated with the packet is empty: reset a queue pointer in the hash entry associated with the packet, update a hash entry counter of the packet queue of the packet, and, based on a determination that the hash entry counter of the packet queue of the packet is indicative that the packet queue of the packet is empty, move the packet queue of the packet from a list of active packet queues associated with a scheduler to a set of available packet queues associated with the scheduler.

In at least some example embodiments, a method includes handling a packet of a flow based on a packet queuing memory space including a hash entry space configured to maintain a set of H hash entries and a packet queue space configured to maintain a set of Q packet queues, wherein H is greater than Q. In at least some example embodiments, only a subset of the hash entries in the hash entry space point to ones of the packet queues in the packet queue space. In at least some example embodiments, when one of the hash entries is associated with a packet queue in the packet queue space that is left empty by departure of the packet, the one of the hash entries becomes empty. In at least some example embodiments, the packet is handled based on a hash function configured to hash the packet into one of the hash entries of the hash entry space. In at least some example embodiments, at least a portion of the packet queues of the packet queue space are pointed to by ones of the hash entries of the hash entry space. In at least some example embodiments, when one of the packet queues has at least one packet queued, the hash entry associated with the one of the packet queues includes a pointer to the one of the packet queues. In at least some example embodiments, the packet is handled based on a scheduler configured to service ones of the packet queues with at least one packet queued. In at least some example embodiments, the ones of the packet queues with at least one packet queued are maintained as a linked list. In at least some example embodiments, the scheduler is a round robin scheduler. In at least some example embodiments, the scheduler maintains a set of available packet queues comprising ones of the packet queues of the packet queue space that are empty. In at least some example embodiments, the set of available packet queues is maintained using a last-in-first-out (LIFO) queue. In at least some example embodiments, the scheduler is configured to transition ones of the packet queues between being associated with the scheduler and being included in the set of available packet queues based on packet events. In at least some example embodiments, the method includes identifying, from the hash entry space, a hash entry associated with the packet, and, based on a determination that the hash entry includes a pointer to one of the packet queues, adding the packet to the one of the packet queues. In at least some example embodiments, the method includes identifying, from the hash entry space, a hash entry associated with the packet, and, based on a determination that the hash entry is empty, dropping the packet based on a determination that an available packet queue is not available in the packet queue space. In at least some example embodiments, the method includes identifying, from the hash entry space, a hash entry associated with the packet, determining, based on a determination that the hash entry is empty, whether an available packet queue is available in the packet queue space, and, based on a determination that an available packet queue is available in the packet queue space: appending the available packet queue to a tail packet queue in a list of active packet queues associated with a scheduler, advancing a round robin tail pointer of the scheduler to the available packet queue in the list of active packet queues associated with the scheduler, setting the hash entry to point to the available packet queue in the list of active packet queues associated with the scheduler, and enqueuing the packet and incrementing a packet counter of the available packet queue. In at least some example embodiments, the method includes updating a packet counter of a packet queue of the packet, and, based on a determination that the packet counter of the packet queue of the packet is indicative that the packet queue is not empty, advancing a round robin tail pointer of a scheduler to the packet queue of the packet. In at least some example embodiments, the method includes updating a packet counter of a packet queue of the packet, and, based on a determination that the packet counter of the packet queue of the packet is indicative that the packet queue is empty: identifying a hash entry associated with the packet queue of the packet, resetting the hash entry associated with the packet queue of the packet, and moving the packet queue of the packet from a list of active packet queues associated with a scheduler to the set of available packet queues associated with the scheduler. In at least some example embodiments, the method includes identifying, from the hash entry space, a hash entry associated with the packet, and, based on a determination that the hash entry includes a pointer to one of the packet queues: enqueuing the packet, incrementing a packet counter of a packet queue of the packet, and incrementing a packet counter of the hash entry associated with the packet. In at least some example embodiments, the method includes identifying, from the hash entry space, a hash entry associated with the packet, based on a determination that the hash entry is empty, determining whether an available packet queue is available in the packet queue space, and, based on a determination that an available packet queue is not available in the packet queue space: setting the hash entry associated with the packet to a next packet queue of a set of active packet queues associated with a scheduler, incrementing a hash entry counter of the next packet queue, enqueuing the packet, incrementing a packet counter of the next packet queue, and incrementing a packet counter of the hash entry associated with the packet. In at least some example embodiments, the method includes identifying, from the hash entry space, a hash entry associated with the packet, based on a determination that the hash entry is empty, determining whether an available packet queue is available in the packet queue space, and, based on a determination that an available packet queue is available in the packet queue space: appending the available packet queue to a tail packet queue in a list of active packet queues associated with a scheduler, advancing a round robin tail pointer of the scheduler to the available packet queue in the list of active packet queues associated with the scheduler, setting the hash entry to point to the available packet queue in the list of active packet queues associated with the scheduler, incrementing a hash entry counter of the available packet queue, enqueuing the packet and incrementing a packet counter of the available packet queue, and incrementing a packet counter of the hash entry associated with the packet. In at least some example embodiments, the method includes identifying, from the hash entry space, a hash entry associated with the packet, updating a packet counter of a packet queue of the packet and a packet counter of the hash entry associated with the packet, and, based on a determination that the packet counter of the hash entry associated with the packet is indicative that the hash entry associated with the packet is not empty, advancing a round robin tail pointer of a scheduler to the packet queue of the packet. In at least some example embodiments, the method includes identifying, from the hash entry space, a hash entry associated with the packet, updating a packet counter of a packet queue of the packet and a packet counter of the hash entry associated with the packet, and based on a determination that the packet counter of the hash entry associated with the packet is indicative that the hash entry associated with the packet is empty: resetting a queue pointer in the hash entry associated with the packet, updating a hash entry counter of the packet queue of the packet, and based on a determination the flow counter of the packet queue of the packet is indicative that the packet queue of the packet is not empty, advancing a round robin tail pointer of a scheduler to the packet queue of the packet. In at least some example embodiments, the method includes identifying, from the hash entry space, a hash entry associated with the packet, updating a packet counter of a packet queue of the packet and a packet counter of the hash entry associated with the packet, and, based on a determination that the packet counter of the hash entry associated with the packet is indicative that the hash entry associated with the packet is empty: resetting a queue pointer in the hash entry associated with the packet, updating a hash entry counter of the packet queue of the packet, and, based on a determination that the hash entry counter of the packet queue of the packet is indicative that the packet queue of the packet is empty, moving the packet queue of the packet from a list of active packet queues associated with a scheduler to a set of available packet queues associated with the scheduler.

In at least some example embodiments, an apparatus includes means for handling a packet of a flow based on a packet queuing memory space including a hash entry space configured to maintain a set of H hash entries and a packet queue space configured to maintain a set of Q packet queues, wherein H is greater than Q. In at least some example embodiments, only a subset of the hash entries in the hash entry space point to ones of the packet queues in the packet queue space. In at least some example embodiments, when one of the hash entries is associated with a packet queue in the packet queue space that is left empty by departure of the packet, the one of the hash entries becomes empty. In at least some example embodiments, the packet is handled based on a hash function configured to hash the packet into one of the hash entries of the hash entry space. In at least some example embodiments, at least a portion of the packet queues of the packet queue space are pointed to by ones of the hash entries of the hash entry space. In at least some example embodiments, when one of the packet queues has at least one packet queued, the hash entry associated with the one of the packet queues includes a pointer to the one of the packet queues. In at least some example embodiments, the packet is handled based on a scheduler configured to service ones of the packet queues with at least one packet queued. In at least some example embodiments, the ones of the packet queues with at least one packet queued are maintained as a linked list. In at least some example embodiments, the scheduler is a round robin scheduler. In at least some example embodiments, the scheduler maintains a set of available packet queues comprising ones of the packet queues of the packet queue space that are empty. In at least some example embodiments, the set of available packet queues is maintained using a last-in-first-out (LIFO) queue. In at least some example embodiments, the scheduler is configured to transition ones of the packet queues between being associated with the scheduler and being included in the set of available packet queues based on packet events. In at least some example embodiments, the apparatus includes means for identifying, from the hash entry space, a hash entry associated with the packet, and, means for, based on a determination that the hash entry includes a pointer to one of the packet queues, adding the packet to the one of the packet queues. In at least some example embodiments, the apparatus includes means for identifying, from the hash entry space, a hash entry associated with the packet, and means for, based on a determination that the hash entry is empty, dropping the packet based on a determination that an available packet queue is not available in the packet queue space. In at least some example embodiments, the apparatus includes means for identifying, from the hash entry space, a hash entry associated with the packet, means for determining, based on a determination that the hash entry is empty, whether an available packet queue is available in the packet queue space, and means for, based on a determination that an available packet queue is available in the packet queue space: appending the available packet queue to a tail packet queue in a list of active packet queues associated with a scheduler, advancing a round robin tail pointer of the scheduler to the available packet queue in the list of active packet queues associated with the scheduler, setting the hash entry to point to the available packet queue in the list of active packet queues associated with the scheduler, and enqueuing the packet and incrementing a packet counter of the available packet queue. In at least some example embodiments, the apparatus includes means for updating a packet counter of a packet queue of the packet, and means for, based on a determination that the packet counter of the packet queue of the packet is indicative that the packet queue is not empty, advancing a round robin tail pointer of a scheduler to the packet queue of the packet. In at least some example embodiments, the apparatus includes means for updating a packet counter of a packet queue of the packet, and means for, based on a determination that the packet counter of the packet queue of the packet is indicative that the packet queue is empty: identifying a hash entry associated with the packet queue of the packet, resetting the hash entry associated with the packet queue of the packet, and moving the packet queue of the packet from a list of active packet queues associated with a scheduler to the set of available packet queues associated with the scheduler. In at least some example embodiments, the apparatus includes means for identifying, from the hash entry space, a hash entry associated with the packet, and means for, based on a determination that the hash entry includes a pointer to one of the packet queues: enqueuing the packet, incrementing a packet counter of a packet queue of the packet, and incrementing a packet counter of the hash entry associated with the packet. In at least some example embodiments, the apparatus includes means for identifying, from the hash entry space, a hash entry associated with the packet, means for, based on a determination that the hash entry is empty, determining whether an available packet queue is available in the packet queue space, and, means for, based on a determination that an available packet queue is not available in the packet queue space: setting the hash entry associated with the packet to a next packet queue of a set of active packet queues associated with a scheduler, incrementing a hash entry counter of the next packet queue, enqueuing the packet, incrementing a packet counter of the next packet queue, and incrementing a packet counter of the hash entry associated with the packet. In at least some example embodiments, the apparatus includes means for identifying, from the hash entry space, a hash entry associated with the packet, means for, based on a determination that the hash entry is empty, determining whether an available packet queue is available in the packet queue space, and, means for, based on a determination that an available packet queue is available in the packet queue space: appending the available packet queue to a tail packet queue in a list of active packet queues associated with a scheduler, advancing a round robin tail pointer of the scheduler to the available packet queue in the list of active packet queues associated with the scheduler, setting the hash entry to point to the available packet queue in the list of active packet queues associated with the scheduler, incrementing a hash entry counter of the available packet queue, enqueuing the packet and incrementing a packet counter of the available packet queue, and incrementing a packet counter of the hash entry associated with the packet. In at least some example embodiments, the apparatus includes means for identifying, from the hash entry space, a hash entry associated with the packet, means for updating a packet counter of a packet queue of the packet and a packet counter of the hash entry associated with the packet, and, means for, based on a determination that the packet counter of the hash entry associated with the packet is indicative that the hash entry associated with the packet is not empty, advancing a round robin tail pointer of a scheduler to the packet queue of the packet. In at least some example embodiments, the apparatus includes means for identifying, from the hash entry space, a hash entry associated with the packet, means for updating a packet counter of a packet queue of the packet and a packet counter of the hash entry associated with the packet, and means for, based on a determination that the packet counter of the hash entry associated with the packet is indicative that the hash entry associated with the packet is empty: resetting a queue pointer in the hash entry associated with the packet, updating a hash entry counter of the packet queue of the packet, and based on a determination the flow counter of the packet queue of the packet is indicative that the packet queue of the packet is not empty, advancing a round robin tail pointer of a scheduler to the packet queue of the packet. In at least some example embodiments, the apparatus includes means for identifying, from the hash entry space, a hash entry associated with the packet, means for updating a packet counter of a packet queue of the packet and a packet counter of the hash entry associated with the packet, and, means for, based on a determination that the packet counter of the hash entry associated with the packet is indicative that the hash entry associated with the packet is empty: resetting a queue pointer in the hash entry associated with the packet, updating a hash entry counter of the packet queue of the packet, and, based on a determination that the hash entry counter of the packet queue of the packet is indicative that the packet queue of the packet is empty, moving the packet queue of the packet from a list of active packet queues associated with a scheduler to a set of available packet queues associated with the scheduler.

In at least some example embodiments, an apparatus includes a memory and a processor. The memory is configured to provide a packet queuing memory space including a hash entry space configured to maintain a set of H hash entries and a packet queue space configured to maintain a set of Q packet queues, wherein H is greater than Q. The processor is configured to handle queuing and dequeuing of packets using the packet queuing memory space.

In at least some example embodiments, a non-transitory computer readable medium includes program instructions for causing an apparatus to at least handle queuing and dequeuing of packets using a packet queuing memory space, wherein the packet queuing memory space includes a hash entry space configured to maintain a set of H hash entries and a packet queue space configured to maintain a set of Q packet queues, wherein H is greater than Q.

In at least some example embodiments, a method includes handling queuing and dequeuing of packets using a packet queuing memory space, wherein the packet queuing memory space includes a hash entry space configured to maintain a set of H hash entries and a packet queue space configured to maintain a set of Q packet queues, wherein H is greater than Q.

In at least some embodiments, an apparatus includes means for providing a packet queuing memory space including a hash entry space configured to maintain a set of H hash entries and a packet queue space configured to maintain a set of Q packet queues, wherein H is greater than Q, and means for handling queuing and dequeuing of packets using the packet queuing memory space.

BRIEF DESCRIPTION OF THE DRAWINGS

The teachings herein can be readily understood by considering the following detailed description in conjunction with the accompanying drawings, in which:

FIG. 4 depicts an example embodiment of a method for handling a packet based on a packet queuing memory space including a hash entry space and a packet queue space;

FIG. 5 depicts an example embodiment of a method for handling packet arrival and departure events based on a packet queuing memory space including a hash entry space and a packet queue space;

To facilitate understanding, identical reference numerals have been used, where possible, to designate identical elements that are common to the figures.

DETAILED DESCRIPTION

Various example embodiments relate generally to supporting queuing of packets in a communication network. Various example embodiments for supporting queuing of packets in a communication network may be configured to support queueing of packets in a communication network based on a packet queuing memory space including a hash entry space configured to maintain a set of H hash entries and a packet queue space configured to maintain a set of Q packet queues, wherein H is greater than Q. Various example embodiments for supporting queuing of packets in a communication network may be configured to support queueing of packets in a communication network in a manner for handling packet events (e.g., packet arrival events, packet departure events, or the like) while preventing or mitigating queue collisions of hash entries (where a queue collision occurs when multiple hash entries, and the respective network flows of those hash entries, are associated with a single packet queue). It will be appreciated that these and various other embodiments and potential advantages for supporting queuing of packets in a communication network may be further understood by way of reference to the example communication device of FIG. 1.

Figure 1:
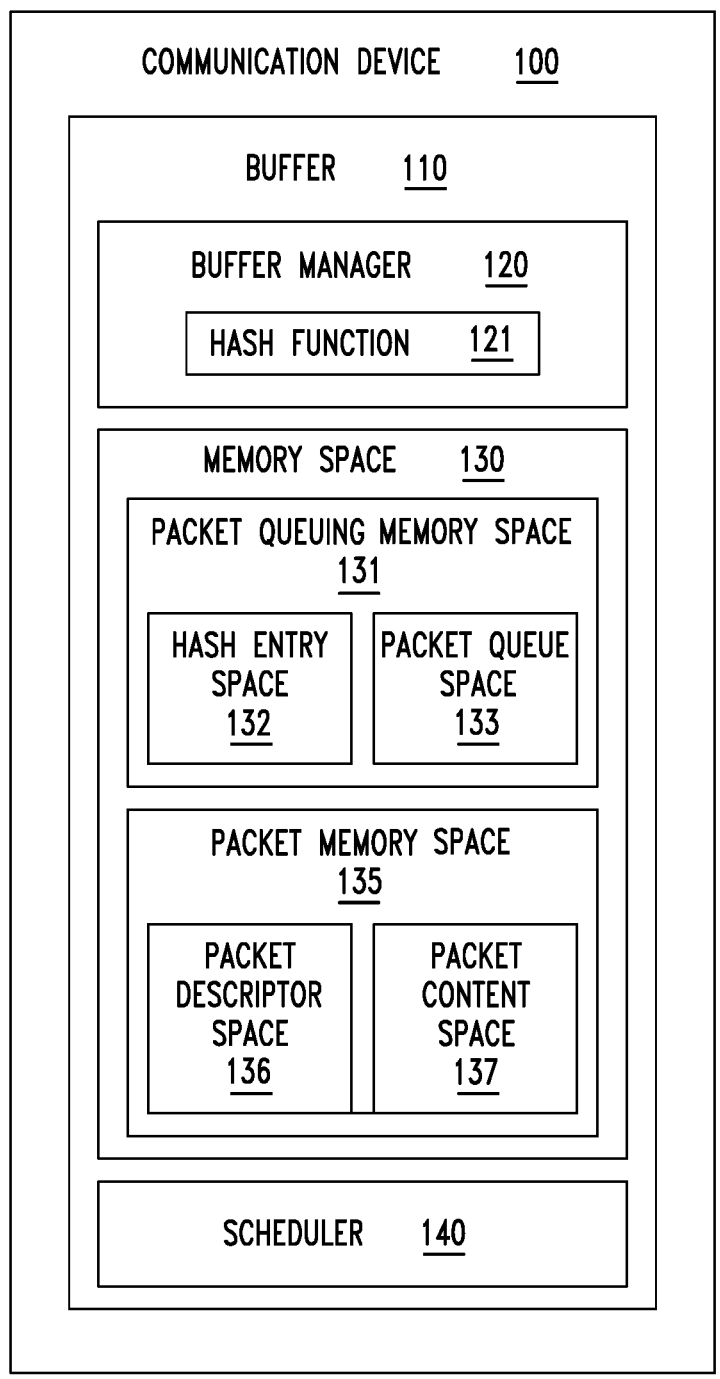
FIG. 1 depicts a communication device including a buffer configured to queue packets at the communication device.

FIG. 1 depicts a communication device including a buffer configured to queue packets at the communication device.

The communication device 100 is configured to support packet-based communications. The communication device 100 may be a physical device or may be a virtual device (e.g., a virtual machine (VM), a virtual container (VC), or the like) implemented on physical resources (e.g., processors, memories, or the like). The communication device 100 may be an end device, a network device which may be deployed within a communication network (e.g., a wireline communication network, a wireless communication network, a datacenter network, an enterprise network, or the like), or the like. For example, communication device 100 may be a user end device (e.g., a smartphone, a laptop, or the like), an automated end device (e.g., an Internet-of-Things (IoT) device, an autonomous device, or the like), a network access node, a router, a switch, or the like. In general, communication device 100 may be any type of device which may employ a buffer configured to support queuing of packets as presented herein.

The communication device 100 includes a buffer 110. The buffer 110 is configured to queue packets awaiting transmission by the communication device 100 (e.g., via an egress link, which has been omitted for purposes of clarity). The packets that are queued may be received at the communication device 100 (e.g., via an ingress link, which has been omitted for purposes of clarity), generated at the communication device 100 (e.g., where communication device 100 is an end device), or the like. The buffer 110 includes a buffer manager 120, a memory space 130, and a scheduler 140. The buffer 120 includes a hash function 121.

The memory space 130 includes a packet queuing memory space 131 and a packet memory space 135. The packet queuing memory space 131 includes a hash entry space 132 and a packet queue space 133. The packet memory space 135 includes a packet descriptor space 136 and a packet content space 137. It will be appreciated that the various spaces may be implemented in various ways (e.g., the packet queuing memory space 131 and the packet descriptor space 136 may be implemented in one portion of an on-chip SRAM and the packet content space 137 may be implemented in another portion of the on-chip SRAM, or the packet queuing memory space 131 and the packet descriptor space 136 may be implemented in an on-chip SRAM and the packet content space 137 may be implemented in an off-chip DRAM, or the like). The buffer 110 is configured to handle queuing of packets based on flow queuing, which may be provided as stochastic fairness queuing (SFQ).

In flow queuing, the buffer 110 stores packets of network flows in dedicated flow queues of the network flows, respectively. In general, a network flow is a sequence of packets that share identical values in some fields of their headers. For example, when the Internet Protocol (IP) version 4 (IPv4) header is used for flow identification, the packets of one network flow may share identical values for the source and destination IP addresses, the source and destination port numbers, and the protocol type (where it will be appreciated that these five fields are typically referred to collectively as a 5-tuple). It will be appreciated that other examples of protocols or services for which headers of packets can be used for association of packets with network flows may include IP version 6 (IPv6), Multiprotocol Label Switching (MPLS), virtual local area networks (VLANs), or the like. The buffer manager 120 may control queuing of packets of the network flows in the flow queues based on application of the hash function 121 and use of the memory space 130. The scheduler 140 may control the distribution of service opportunities to the flow queues (e.g., based on a designated service policy, such as round-robin servicing or the like) based on use of the memory space 130. The memory space 130, as indicated above, stores information associated with queuing of the packets in the buffer 110 and also the packets themselves. The hash entry space 132 stores hash entries (examples of which are presented in FIG. 2) for the hash function 121. The packet queue space 133 stores packet queues (examples of which are presented in FIG. 2) configured for use in controlling queuing of packets queued in the packet memory space 135. The packet descriptor space 136 includes packet descriptors associated with packets stored in the packet content space 137, where the packet descriptor maintained in the packet descriptor space 136 for a packet stored in the packet content space 137 may include information such as a pointer to the packet in the packet content space 137, a packet size of the packet in the packet content space 137, a pointer to the next packet descriptor for the next packet stored in the packet content space 137 for the packet queue, or the like, as well as various combinations thereof. As such, the memory space 130 is configured to support flow queuing as described further herein. As compared to shared queuing, flow queuing offers the capability to differentiate the order of transmission of packets from the order of their arrival. This enables enforcement of preferred shares of the link capacity of the egress link and, thus, low queuing delay for flows of applications that have tight latency requirements. In flow queuing, the association of packet flows with respective flow queues may be performed explicitly or implicitly.

In SFQ, the buffer 110 stores packets of network flows in dedicated flow queues of the network flows, respectively, based on implicit mapping of the packets into the dedicated flow queues (e.g., based on generic rules that typically do not recognize the different types of traffic). In SFQ, the mapping of packets onto dedicated per-flow queues may be obtained by application of the hash function 121 to the headers of incoming packets, where each hash value corresponds to a flow queue, such that all packets that produce the same hash value end up in the same queue. In SFQ, the scheduler 140 may be implemented as a round-robin scheduler due to its even fairness properties. It will be appreciated that, with the implicit association of SFQ, the operation of the buffer manager 120 and the scheduler 140 may be fully automated and self-contained (e.g., external control-plane actions are not needed as new flows arrive and old flows terminate and, therefore, can be deployed without the need for changes in the network control and management planes). It will be appreciated that SFQ can be an effective tool for enforcing flow isolation, fairness, and low latency without control-plane overhead. Additionally, SFQ can be quite beneficial whenever flows of applications with diverse throughput and latency requirements share a network link. An example is in mobile networks (e.g., Third Generation (3G), Fourth Generation (4G), Fifth Generation (5G), or the like), where flow queues enable the coexistence, within the same radio bearer, of over-the-top interactive and real-time applications (e.g., conversational video, gaming, or the like) with greedy, throughput-intensive applications (e.g., large file transfers associated with software updates, large video file downloads, or the like). Another example is in data center networks. Additionally, SFQ also may be a remedy against sources of performance degradation in data center networks (e.g., TCP incast, mice-elephants interference, and so forth).

In SFQ, as indicated above, the mapping of packets onto dedicated per-flow queues may be obtained by application of a hash function (such as hash function 121) to the headers of incoming packets. As previously discussed, when flow identification is based, for example, on the IPv4 header, flows may be defined based on tuples, such as the 5-tuple. A 5-tuple consists of 13 octets (4 octets for each IP address, 2 octets for each port number, and 1 octet for the protocol type) and, thus, a total of 104 bits. As such, allocation of a flow queue for each possible 5-tuple value would result in allocation of more than $10^{31}$ queues (a large majority of which would probably never be used). The use of a hash function in SFQ compresses the full space of 5-tuple values into a much smaller range, which can then be handled within the memory budget available for implementation of the flow queues (e.g., packet queuing memory space 131); however, the compression resulting from use of the hash function unavoidably creates the possibility of hash collisions (i.e., where packets from different flows end up being mapped onto the same hash value and, therefore, stored in the same flow queue). It is noted that such hash collisions violate the primary expectation associated with flow queuing (namely, enforcement of ideal service fairness), since the scheduler 140 assigns services per queue (as opposed to per flow) and flows that collide into the same hash value (and flow queue) end up receiving a fraction of the bandwidth received by flows in truly dedicated flow queues (thereby resulting in degradations of both throughput and latency for the colliding flows). A flow queue also may be referred to herein as a packet queue, whether or not it may experience flow collisions.

In SFQ, as indicated above, use of a hash function (such as hash function 121) may enable compression of the space of 5-tuples, but creates the possibility of hash collisions. The probability of hash collision ultimately depends on the ratio between the number H of available hash values and the maximum number F of flows that can be simultaneously active in a link (such that it may be desirable to support a hashing architecture that, within a given packet queuing memory space M available for implementation of the hash table and flow queues, maximizes the H/F ratio).

The packet queuing memory space 131 may be configured to reduce the hash collision probability based on a clear separation between the number H of hash values and the number Q of packet queues. The packet queuing memory space 131 may be configured to reduce the hash collision probability based on configuration of the packet queuing memory space 131 such that the number H of hash values is greater than the number Q of packet queues or even such that that the number H of hash values is much greater than the number Q of packet queues (i.e., H>>Q). The configuration of the packet queuing memory space in this manner may be based on the following two observations. First, the amount of memory $m_q$ needed for instantiation of one packet queue (which, in a relatively minimal realization, includes at least a pair of pointers for the head and tail packets, at least one pointer to the next queue in the round-robin list of active packet queues associated with the scheduler 140, and a counter for the number of packets currently queued) can be much larger than the amount of memory $m_h$ needed for instantiation of a hash entry if that hash entry only includes a queue pointer (e.g., a mapping of the hash value to the pointer to the associated packet queue). Second, the probability of at least one hash collision between active flows increases with the hash load and already may be relatively high (about 10%) when the load level is relatively low (about 10%). Based at least on these observations, it has been determined that the hash collision probability may be reduced based on configuration of the packet queuing memory space 131 as presented herein (namely, partitioning of the packet queuing memory space 131 into the hash entry space 132 and the packet queue space 133 where the cardinality of the hash entry set may be much larger than the cardinality of the packet queue set (H>>Q)). It is noted that, where M is the size of the packet queuing memory space 131, if the size of each hash entry is $m_h$ and the size of each packet queue is $m_q$, then the feasible numbers of hash values and packet queues may be jointly bounded as follows: $H \cdot m_h + Q \cdot m_q \leq M$. The partitioning of the packet queuing memory space 131 to provide the hash entry space 132 and the packet queue space 133 may be further understood by way of reference to FIG. 2.

Figure 2:
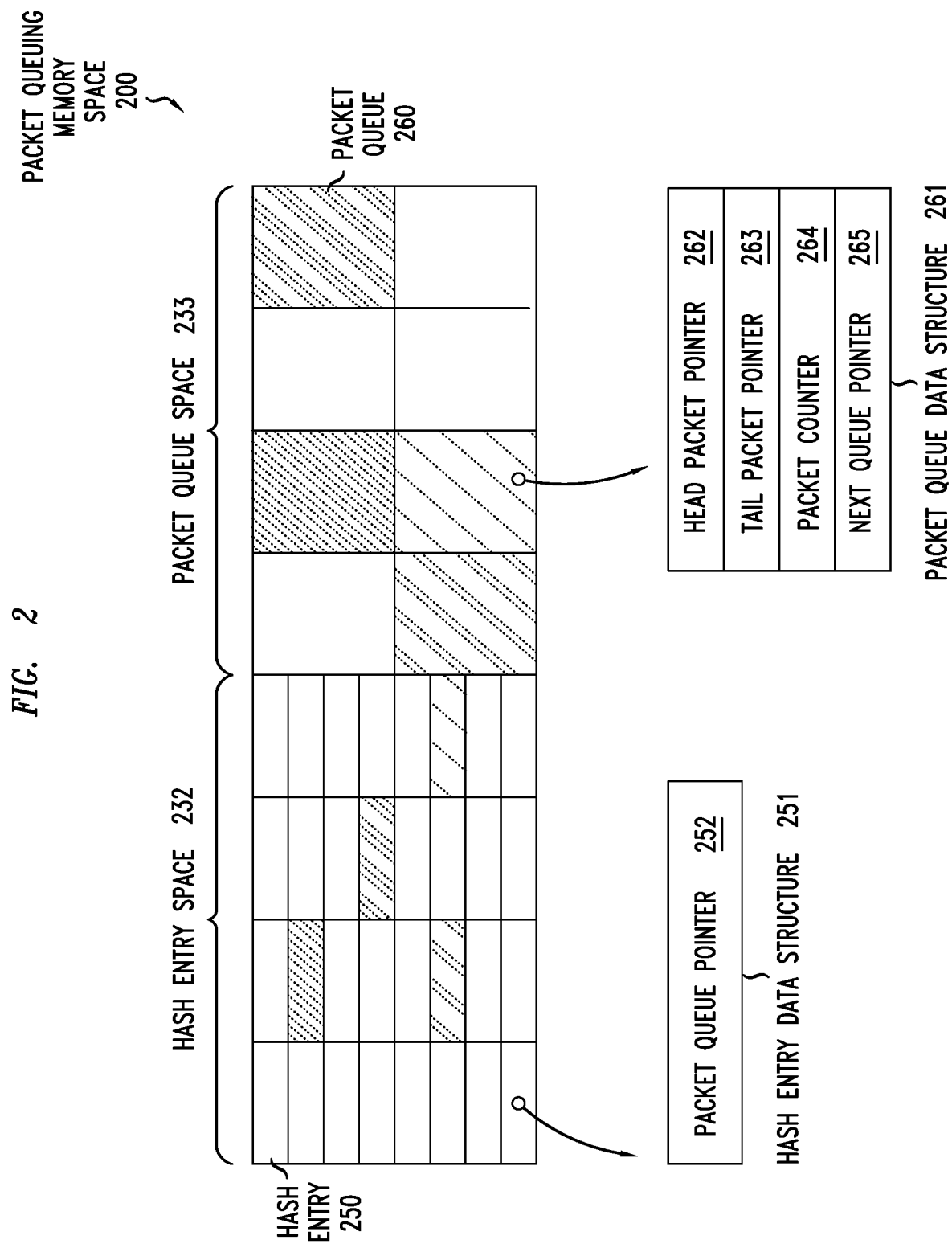
FIG. 2 depicts an example embodiment of a packet queuing memory space, including a hash entry space and a packet queue space, configured to support queuing of packets at a communication device.

FIG. 2 depicts an example embodiment of a packet queuing memory space, including a hash entry space and a packet queue space, configured to support queuing of packets at a communication device.

The packet queuing memory space 200 includes a hash entry space 232 and a packet queue space 233. The packet queuing memory space 200 may be used as packet queuing memory space 131 of communication device 100 of FIG. 1 (with hash entry space 232 corresponding to hash entry space 132 of packet queuing memory space 131 and packet queue space 233 corresponding to packet queue space 133 of packet queuing memory space 131).

The packet queuing memory space 200 is configured such that the hash entry space 232 maintains a set of H hash entries 250 (where, in the example of FIG. 2, H is 32) and the packet queue space 233 maintains a set of Q packet queues 260 (where, in the example of FIG. 2, Q is 8). In other words, the packet queuing memory space 200 is configured such that the packet queuing memory space includes more hash entries 250 than packet queues 260 (i.e., H>Q). It will be appreciated that, although primarily presented with respect to use of specific numbers of hash entries 250 than packet queues 260, various other combinations of numbers of hash entries 250 and packet queues 260, with H>Q, may be used.

The hash entry space 232 of the packet queuing memory space 200, as indicated above, maintains a set of H hash entries 250 (where, in the example of FIG. 2, H is 32). As depicted in FIG. 2, each hash entry 250 in the hash entry space 232 includes a packet queue pointer 252. The packet queue pointer 252 of a hash entry 250 includes a pointer to a location of a packet queue in the packet queue space 233 in cases where the hash entry 250 is associated with a packet queue (the hash entries 250 of FIG. 2 that are shaded, with the shading indicating correspondence between the hash entry 250 and the packet queue 260 with which it is associated) or a NULL value in cases where the hash entry 250 is not associated with a packet queue (the hash entries 250 of FIG. 2 that are not shaded). It is noted that the hash value that maps to a given hash entry 250 does not need to be explicitly stored as part of the hash entry 250; rather, it may be implicitly associated with the memory location of the hash entry 250 within the hash entry space 232 (e.g., application of the hash function produces a number which is the same as the address of the memory location (e.g., using an identity function in which the hash value is the same as the address of the memory location or other suitable type of function) or which may be converted into the memory location (e.g., via a linear function or other suitable type of function)).

The packet queue space 233 of the packet queuing memory space 200, as indicated above, maintains a set of Q packet queues 260 (where, in the example of FIG. 2, Q is 8). The packet queues 260 are flow queues configured to support queuing of packets of network flows, respectively. As depicted in FIG. 2, each packet queue 260 in the packet queue space 233 includes a packet queue data structure 261 including a head packet pointer 262 (which may include a pointer to an associated packet descriptor in the packet descriptor space 136 which then points to the associated packet in the packet content space 137), a tail packet pointer 263 (which may include a pointer to an associated packet descriptor in the packet descriptor space 136 which then points to the associated packet in the packet content space 137), a packet counter 264, and a next queue pointer 265. It is noted that the packet queue data structure 261 includes pointers to the head packet and the tail packet in the set of packets queued based on that associated packet queue 260 (but not to other packets between the head packet and the tail packet in the set of packets queued using that associated packet queue 260). In the available packet queues 260 in the packet queue space 233 which are not currently associated with a hash entry 250 in the hash entry space 232 (the packet queues 260 of FIG. 2 that are not shaded), the packet queue data structures 261 are empty and the packet queues 260 are available for supporting queuing of packets of new flows (in the packet memory space 135) arriving at the communication device. In the active packet queues 260 in the packet queue space 233 which are currently associated with a hash entry 250 in the hash entry space 232 (the packet queues 260 of FIG. 2 that are shaded, with the shading indicating correspondence between the hash entry 250 and the packet queue 260 with which it is associated), the packet queue data structures 261 are populated and the packet queues 260 are currently supporting queueing one or more packets of the flows associated with the hash entries 250 (in the packet memory space 135), respectively.

It is noted that, in dimensioning the partitioning between the hash entry space 232 and the packet queue space 233, the trade-off between probability of hash collisions and probability of queue saturation may be considered (e.g., for a given total packet queuing memory space M, a larger hash entry space lowers the probability of hash collisions, but increases the probability of queue saturation events, where a queue saturation event occurs when all packet queues 260 in the packet queue space 233 are associated with respective network flows). This may be further understood with respect to the following example. For example, if each queue pointer, each packet pointer, and each packet counter is 2 octets (16 bits) wide, then the size of a packet queue data structure 261 is $m_q=2\times 4=8$ octets. Additionally, for example, if M=64 kB, the number of hash entries and the number of packet queues may be implemented in various ways (using different quantities) using the 64 kB (e.g., a total of 48 kB can be used for 24,576 hash table entries of size $m_h=2$ octets each and the remaining 16 kB can be used for $2^{14}/8=2,048$ packet queues). The maximum load level allowed by the arrangement of this example is 2,048/24,576=0.0833, or slightly below 10%. If the maximum number of simultaneously active flows expected is much lower, the number of queues could be lowered further (e.g., to 1,024) in order to create space for additional hash values (4,096 more hash entries, for a total of 28,672 hash entries) and further reduce the probability of hash collisions. If, instead, the efficiency of implementation of the hash calculations is most critical, the hash value range may be the maximum allowed by a given number of bits (e.g., in the example with M=64 kB this range could extend over 16,384 hash values, if using the full range of numerical values covered with 15 bits, and the resulting number of packet queues is 4,096). It will be appreciated that the dimensioning of the partitioning between the hash entry space 232 and the packet queue space 233 may be performed in other ways, based on other considerations, or the like, as well as various combinations thereof.

Figure 3:
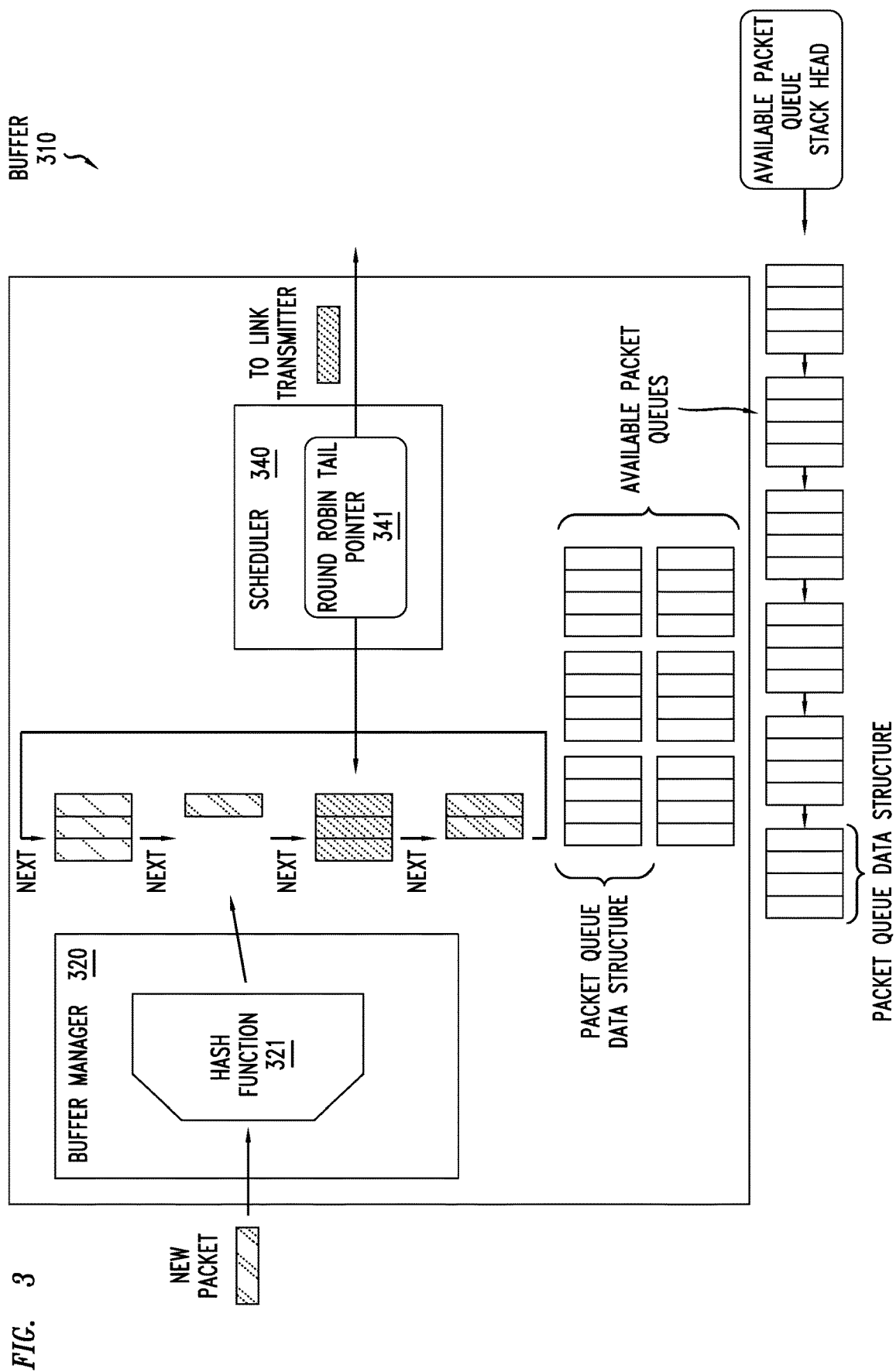
FIG. 3 depicts a buffer configured to queue packets at the communication device based on use of a packet queuing memory space including a hash entry space and a packet queue space.

The use of the packet queuing memory space 200 to support handling of packets by the communication device 100 may be further understood by way of reference to FIG. 3.

FIG. 3 depicts a buffer configured to queue packets at the communication device based on use of a packet queuing memory space including a hash entry space and a packet queue space.

The buffer 310 includes a buffer manager 320 and a scheduler 340. The buffer 310 may be used as the buffer 110 of communication device 100 of FIG. 1 (with buffer manager 320 corresponding to buffer manager 120 and the scheduler 340 corresponding to scheduler 140). The buffer 310 also includes packet queues, including active packet queues and available packet queues which are discussed further below. It will be appreciated that certain portions of buffer 110 of FIG. 1 are omitted from buffer 310 of FIG. 3 for purposes of clarity.

In the example of FIG. 3, four active packet queues are associated with the scheduler 340. The four active packet queues (those currently queuing one or more packets for respective flows) are associated with the scheduler 340 in a round-robin linked list. The four active packet queues are depicted with one rectangle for each packet currently queued, wherein each rectangle represents a packet descriptor from a packet descriptor space (such as packet descriptor space 136 of buffer 110 of FIG. 1), pointing to a corresponding packet in a packet content space (such as packet content space 137 of buffer 110 of FIG. 1).

In the example of FIG. 3, six available packet queues are available for association with the scheduler 340 based on hashing of packets by buffer manager 320. The available packet queues (those not currently queuing any packets for flows) are available for supporting queuing of packets of new flows. The six available packet queues are depicted as sets of four rectangles, respectively, wherein each rectangle of an available packet queue represents one field of a packet queue data structure of the available packet queue (such as packet queue data structure 261 of FIG. 2, where the four rectangles represent the head packet pointer 262, the tail packet pointer 263, the packet counter 264, and the next queue pointer 265). The available packet queues, as illustrated in FIG. 3, may be maintained as a set of available packet queues. The set of available packet queues may be maintained using a queue structure, such as a last-in-first-out (LIFO) queue, which also may be referred to as a stack.

The buffer 310 is configured to support queuing of new packets that arrive at the communication device of buffer 310. The hash function 321 of the buffer manager 320 maps new packets onto packet queues in the packet queuing memory space of the buffer 310. The mapping may include a first step where the hash function 321 computes a hash value for the new packet and a second step that looks within the packet queuing memory space for an active packet queue that is already associated with the hash entry of the hash value, or for an available packet queue. If an active packet queue is not already associated with the hash entry of the hash value and at least one available packet queue is found in the packet queuing memory space of the buffer 310, the new packet is stored in the packet content space of the packet queuing memory space and a corresponding packet descriptor is linked to an available packet queue of the packet queuing memory space that is then associated, as a new active packet queue, with the hash entry of the hash value and with the round robin list of active packet queues associated with the scheduler 340. If an active packet queue is already associated with the hash entry of the hash value (and, thus, with the scheduler 340), the new packet is stored in the packet content space of the packet queuing memory space and a corresponding packet descriptor is linked to the tail of the packet queue of the packet queuing memory space. In the example of FIG. 3, the new packet that is received at the communication device is associated with a hash entry for which one packet is already queued, so the new packet will be queued behind the packet already in the packet queue and the position of the packet queue in the round robin list of active packet queues associated with the scheduler 340 does not change. The handling of arriving packets may be further understood by way of reference to FIGS. 4, 5, 6, and 8.

The buffer 310 is configured to support departures of existing packets queued at the communication device of buffer 310. The scheduler 340 supports a round robin tail pointer 341 that points to the active packet queue, of the round robin list of active packet queues, which was last serviced by the scheduler 340 or which, if not last serviced by the scheduler 340, was last added to the round robin list of active packet queues. In the example of FIG. 3, the scheduler 340 has extracted a packet from the head of the active packet queue that was pointed to by the next queue pointer 265 in the packet queue data structure 261 of the active packet queue pointed to by the round robin tail pointer

341, and has provided the packet to the link transmitter for transmission over the associated egress link. Then, after moving the packet associated with the active packet queue from the packet content space of the packet queuing memory space to the link transmitter, the scheduler 340 has advanced the round robin tail pointer 341 to the same active packet queue, because that active packet queue has remained active (with three more packets queued) after the transfer of the packet to the link transmitter for transmission over the associated egress link. The handling of departing packets may be further understood by way of reference to FIGS. 4, 5, 7, and 9.

The handling of packet queuing, including placement of packets into queues during packet arrival events and extraction of packets from queues during packet departure events, may be further understood by way of further reference to communication device 100 of FIG. 1.

The communication device 100 may be configured to handle queuing of packets, including placement of packets into queues during packet arrival events and extraction of packets from queues during packet departure events. It is noted that example embodiments of handling queuing of packets at a communication device, based on use of a packet queuing memory space including a hash entry space and a packet queue space, are presented with respect to FIG. 4 and FIG. 5.

FIG. 4 depicts an example embodiment of a method for handling a packet based on a packet queuing memory space including a hash entry space and a packet queue space. It will be appreciated that, although primarily presented herein as being performed serially, at least a portion of the functions of method 400 may be performed contemporaneously or in a different order than as presented in FIG. 4.

At block 401, method 400 begins.

At block 410, handle a packet of a flow based on a packet queuing memory space including a hash entry space configured to maintain a set of H hash entries and a packet queue space configured to maintain a set of Q packet queues, wherein H is greater than Q. An example embodiment of a method for handling packet arrival and departure events based on such a packet queuing memory space is presented with respect to FIG. 5.

At block 499, method 400 ends.

FIG. 5 depicts an example embodiment of a method for handling packet arrival and departure events based on a packet queuing memory space including a hash entry space and a packet queue space. It will be appreciated that, although primarily presented herein as being performed serially, at least a portion of the functions of method 500 may be performed contemporaneously or in a different order than as presented in FIG. 5.

At block 501, method 500 begins.

At block 510, a determination is made as to whether a packet has arrived. If a packet has arrived, method 500 proceeds to block 520. If a packet has not arrived, method 500 proceeds to block 530.

At block 520, the packet arrival is handled. The packet arrival may be handled by a buffer manager of the buffer based on the packet queuing memory space. The packet arrival may be handled as presented with respect to FIG. 6, as presented with respect to FIG. 8, or the like. From block 520, method 500 returns to block 510 (to determine whether another packet has arrived).

At block 530, a determination is made as to whether a packet has departed. If a packet has departed, method 500 proceeds to block 540. If a packet has not departed, method 500 returns to block 510.

At block 540, the packet departure is handled. The packet departure may be handled by a scheduler of the buffer based on the packet queuing memory space. The packet departure may be handled as presented with respect to FIG. 7, as presented with respect to FIG. 9, or the like. From block 540, method 500 returns to block 530 (to determine whether another packet has departed).

It will be appreciated that, although primarily presented with respect to an embodiment in which method 500 is configured to check for an arrival after processing an arrival and to check for a departure after processing a departure, method 500 may be configured to perform checks for arrivals and departures in various other ways (e.g., checking for a departure after processing an arrival (proceeding from 510 to 540) and checking for an arrival after processing a departure (proceeding from 530 to 520). It will be appreciated that various combinations of such options may be used.

It will be appreciated that, although method 500 does not include an ending block, method 500 may be terminated under various conditions.

It will be appreciated that, although method 500 supports handling of both packet arrivals and packet departures, packet arrivals and packet departures may be handled by separate processes, running in parallel, respectively.

The communication device 100, as indicated above, may be configured to handle packet arrival events. A new packet arrives at the communication device 100. The header of the packet (or a particular tuple, such as a 5-tuple, of the packet header) is hashed into a hash entry 250 that includes a packet queue pointer 252. If the packet queue pointer 252 is NULL, this indicates that the flow to which the packet belongs does not currently have any packets queued in the packet memory space 135 of the buffer 110, so an available packet queue 260 is selected from the packet queue space 133 (e.g., from the top of the stack of available packet queues 260, when the set of available packet queues 260 is maintained using a stack), the hash entry 250 associated with the flow to which the packet belongs is updated to include the pointer to the available packet queue 260 selected from the packet queue space 133, the available packet queue selected from the packet queue space 133 is updated to reflect the queuing of the packet in the packet content space 137 (as both the head and the tail packet queued for the flow, since this is the first packet queued for the flow) of the packet memory space 135, and the available packet queue 260 is associated with the scheduler 140 (e.g., by appending the pointer to the available packet queue 260 to the packet queue 260 that is currently at the end of the list of active packet queues 260 associated with the scheduler 140) so that the available packet queue 260 may be serviced by the scheduler 140 after all other packet queues 260 that are currently active are served by the scheduler 140. If the packet queue pointer 252 is not NULL (and, rather, includes a pointer to an active packet queue 260 that is already associated with the scheduler 140), this indicates that the flow to which the packet belongs does currently have at least one packet queued in the buffer 110, so the active packet queue 260 that is already associated with the scheduler 140 is updated to reflect the queuing of the packet in the packet content space 137 (as the tail packet queued for the flow) of the packet memory space 135. In both cases the packet counter of the packet queue is incremented by one unit. An example embodiment of a method for handling a packet arrival in this manner is presented with respect to FIG. 6.

Figure 6:
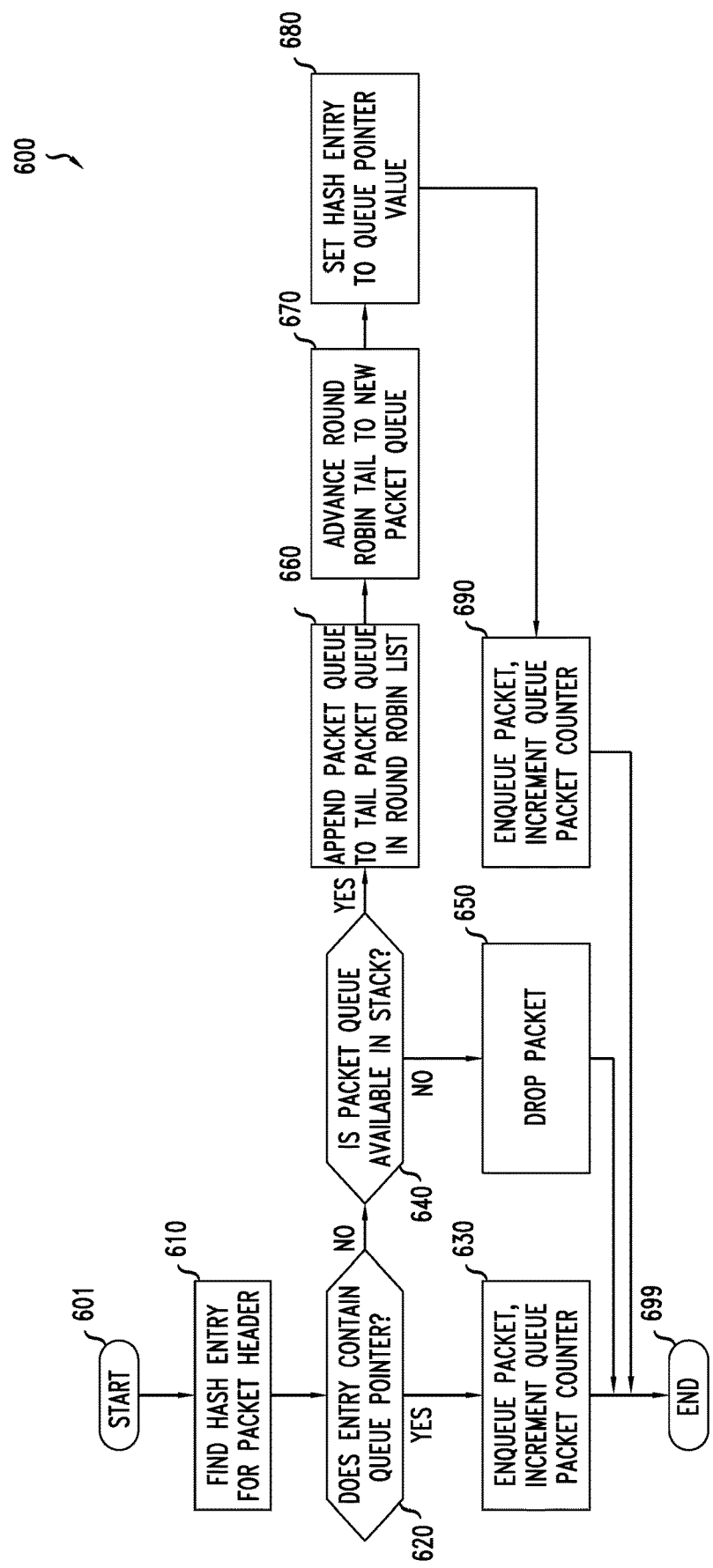
FIG. 6 depicts an example embodiment of a method for handling a packet arrival event, based on a packet queuing memory space including a hash entry space and a packet queue space, where queue collisions of hash entries are prevented.

FIG. 6 depicts an example embodiment of a method for handling a packet arrival event, based on a packet queuing memory space including a hash entry space and a packet queue space, where queue collisions of hash entries are prevented. It will be appreciated that, although primarily presented herein as being performed serially, at least a portion of the functions of method 600 may be performed contemporaneously or in a different order than as presented in FIG. 6.

At block 601, method 600 begins.

At block 610, a hash value for the packet header of the arriving packet is identified. The hash value, which may be identified based on application of a hash function to the header or a portion of the header, points to one hash entry in the hash entry space of the packet queuing memory space. From block 610, method 600 proceeds to block 620.

At block 620, a determination is made as to whether the hash entry for the packet header of the arriving packet includes a queue pointer (which also may be considered to be a determination as to whether a packet queue for the flow with which the arriving packet is associated is currently active). If a determination is made that the hash entry for the packet header of the arriving packet includes a queue pointer (i.e., at least one other packet of the flow is currently queued), method 600 proceeds to block 630. If a determination is made that the hash entry for the packet header of the arriving packet does not include a queue pointer (i.e., no other packets of the flow are currently queued), method 600 proceeds to block 640.

At block 630, the arriving packet is added to the packet queue pointed to by the queue pointer of the hash entry for the packet header of the arriving packet. From block 630, method 600 proceeds to block 699, where method 600 ends.

At block 640, a determination is made as to whether a packet queue is available for supporting queuing of the arriving packet. This may be a determination as to whether an available packet queue is available in a set of available packet queues in the packet queue space of the packet queuing memory space. If a determination is made that a packet queue is not available for supporting queuing of the arriving packet (e.g., the stack of available packet queues is empty), method 600 proceeds to block 650. If a determination is made that a packet queue is available for supporting queuing of the arriving packet (e.g., the stack of available packet queues is not empty), method 600 proceeds to block 660.

At block 650, the arriving packet is dropped. From block 650, method 600 proceeds to block 699, where method 600 ends.

At block 660, the packet queue that is available for the arriving packet is moved from the set of available packet queues (not associated with the scheduler) to being associated with the scheduler as a new packet queue associated with the scheduler for the arriving packet. The new packet queue may be the top packet queue in a stack of available packet queues where the available packet queues are maintained using a stack. The new packet queue is moved to the end of the list of active packet queues associated with the scheduler, next to the packet queue pointed to by the round robin tail pointer of the scheduler (e.g., by setting the next queue pointer of the packet queue currently pointed to by the round robin tail pointer so that it points to the new packet queue). From block 660, method 600 proceeds to block 670.

At block 670, the round robin tail pointer of the scheduler is set to point to the new packet queue, so that the new packet queue becomes the new tail of the list of active packet queues associated with the scheduler. From block 670, method 600 proceeds to block 680.

At block 680, the hash entry for the packet header of the arriving packet is set to the queue pointer of the new packet queue for the arriving packet. From block 680, method 600 proceeds to block 690.

At block 690, the arriving packet is added to the packet queue for the arriving packet. The packet counter of the new packet queue is incremented to reflect the addition of the arriving packet to the new packet queue. From block 690, method 600 proceeds to block 699, where method 600 ends.

At block 699, method 600 ends.

The communication device 100, as indicated above, may be configured to handle packet departure events. An existing packet that is currently queued at the communication device 100 is extracted from the packet content space 137 of the packet memory space 135 by the scheduler 140 (based on the packet descriptor space 136 of the packet memory space 135 and the packet queue space 133 of the packet queuing memory space 131) and passed to a transmitter (e.g., for transmission over an egress link of the communication device 100). The packet that is extracted is the packet in the packet content space 137 that is pointed to by the packet descriptor in packet descriptor space 136 currently at the head of the packet queue 260 that is first to be served within the set of packet queues 260 associated with the scheduler 140 (e.g., the packet queue pointed to by the next queue pointer 265 of the packet queue 260 currently pointed to by the round robin tail pointer 341 of the scheduler 140). The packet counter 264 of the packet queue 260 is decremented by one unit. If the packet queue 260 for which the packet was extracted is now empty after departure of the packet, the packet queue 260 is disassociated from the scheduler 140 (e.g., removed from the linked list of the set of packet queues 260 associated with the scheduler 140) and moved back to the set of available packet queues 260 (e.g., pushed onto the top of the stack of available packet queues 260, when the set of available packet queues 260 is maintained using a stack). If the packet queue 260 for which the packet was extracted is not empty after departure of the packet, the packet queue 260 remains associated with the scheduler 140 (e.g., it remains in the linked list of the set of packet queues 260 associated with the scheduler 140) and the round robin tail pointer 341 of the scheduler 140 moves to the packet queue 260 from which the packet was extracted. An example embodiment of a method for handling a packet departure in this manner is presented with respect to FIG. 7.

Figure 7:
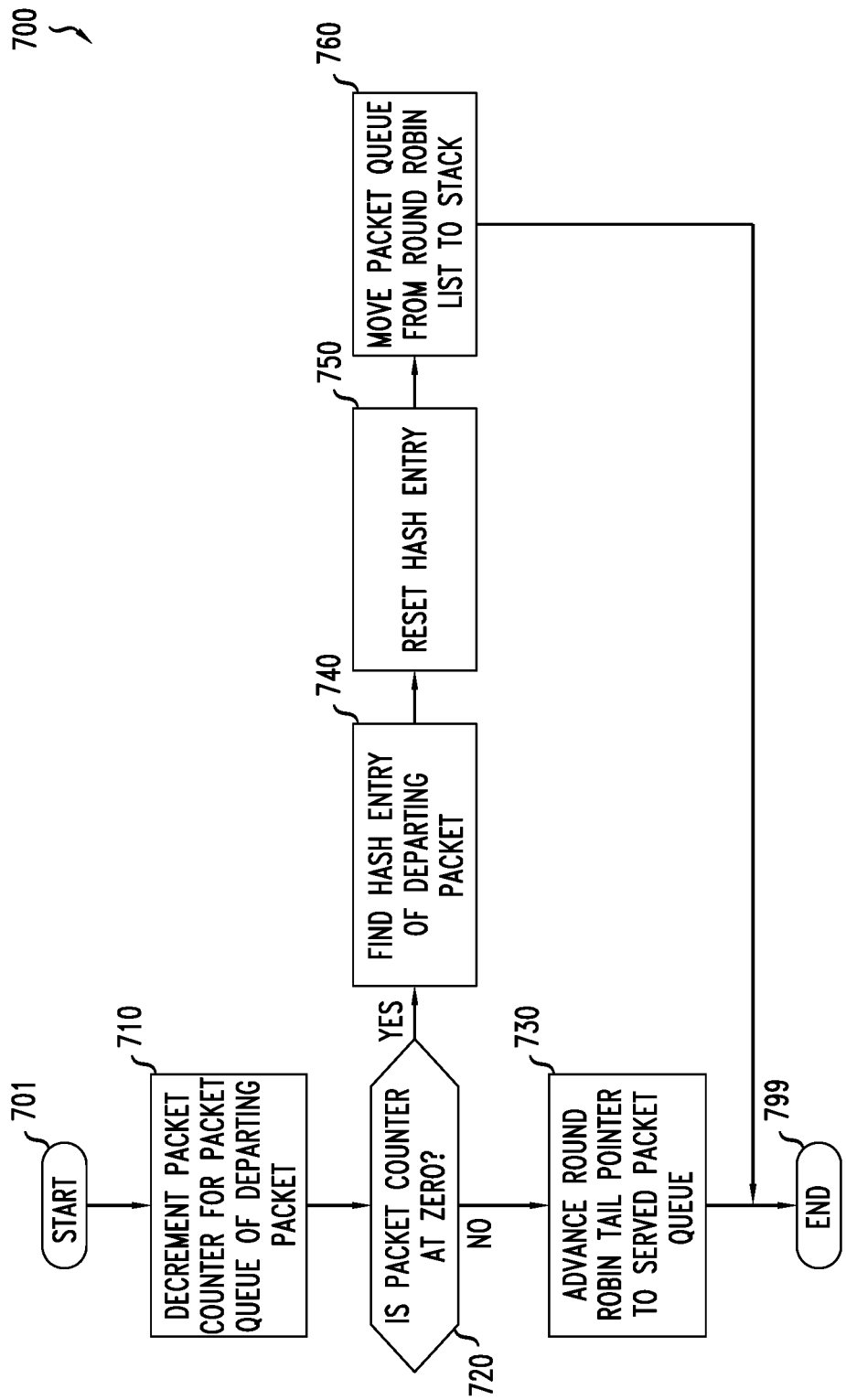
FIG. 7 depicts an example embodiment of a method for handling a packet departure event, based on a packet queuing memory space including a hash entry space and a packet queue space, where queue collisions of hash entries are prevented.

FIG. 7 depicts an example embodiment of a method for handling a packet departure event, based on a packet queuing memory space including a hash entry space and a packet queue space, where queue collisions of hash entries are prevented. It will be appreciated that, although primarily presented herein as being performed serially, at least a portion of the functions of method 700 may be performed contemporaneously or in a different order than as presented in FIG. 7.

At block 701, method 700 begins.

At block 710, the packet counter of the packet queue of the departing packet is decremented. From block 710, method 700 proceeds to block 720.

At block 720, a determination is made as to whether the packet counter of the packet queue of the departing packet is zero. If a determination is made that the packet counter of the packet queue of the departing packet is not zero, method 700 proceeds to block 730. If a determination is made that the packet counter of the packet queue of the departing packet is zero, method 700 proceeds to block 740.

At block 730, the tail of the list of active packet queues associated with the scheduler is advanced to the packet queue of the departing packet. From block 730, method 700 proceeds to block 799, where method 700 ends.

At block 740, a hash value for the packet header of the departing packet is identified. The hash value, which may be identified based on application of a hash function to the header or a portion of the header, points to a hash entry in the hash entry space of the packet queuing memory space. From block 740, method 700 proceeds to block 750.

At block 750, the hash entry for the packet header of the departing packet is reset. The hash entry for the packet header of the departing packet is reset by changing the queue pointer of the hash entry from the value of the packet queue from which the packet was extracted by the scheduler to a value indicative that the hash entry is not currently associated with an active packet queue (e.g., NULL). From block 750, method 700 proceeds to block 760.

At block 760, the packet queue from which the packet was extracted by the scheduler is moved from being associated with the scheduler (e.g., in the list of active packet queues) to no longer being associated with the scheduler (e.g., in the set of available packet queues). The packet queue may be pushed onto the top of a stack of available packet queues when the available packet queues are maintained using a stack. From block 760, method 700 proceeds to block 799.

At block 799, method 700 ends.

It is noted that, since H >Q, it can happen that an arriving packet is mapped onto a hash entry that does not have an associated packet queue at a time when there are no available packet queues to handle the arriving packet, because the number f of currently active flows (i.e., flows with buffered packets) is equal to the number Q of available queues. This may be referred to as a queue saturation condition, which may be handled in various ways. In at least some embodiments, for example, as presented with respect to FIG. 6 and FIG. 7, such a collision of hash table entries onto common shared packet queues may be handled by dropping the arriving packet. In at least some embodiments, such a collision of hash entries onto common shared packet queues may be handled by allowing hash entries and their respective flows to share the same packet queue and then handling the condition based on the addition of a packet counter to each hash entry and on the addition of a hash entry counter to each packet queue, embodiments of which are presented with respect to FIG. 8 (for packet arrival events) and FIG. 9 (for packet departure events). It is noted that, while addition of these two counters may lower the number of hash entries and packet queues that packet queuing memory space 131 can accommodate, it avoids packet losses in cases where the packet buffer is not saturated but the set of available packet queues is empty (i.e., upon occurrence of the queue saturation condition). It will be appreciated that such embodiments may support a tradeoff between the avoidance of packet losses due to queue saturation in exchange for degraded fairness (more flows may collide into the same hash entry because of the reduction in the number of entries due to the increased memory occupancy of individual hash entries and packet queues, and multiple hash entries may collide into the same packet queue).

Figure 8:
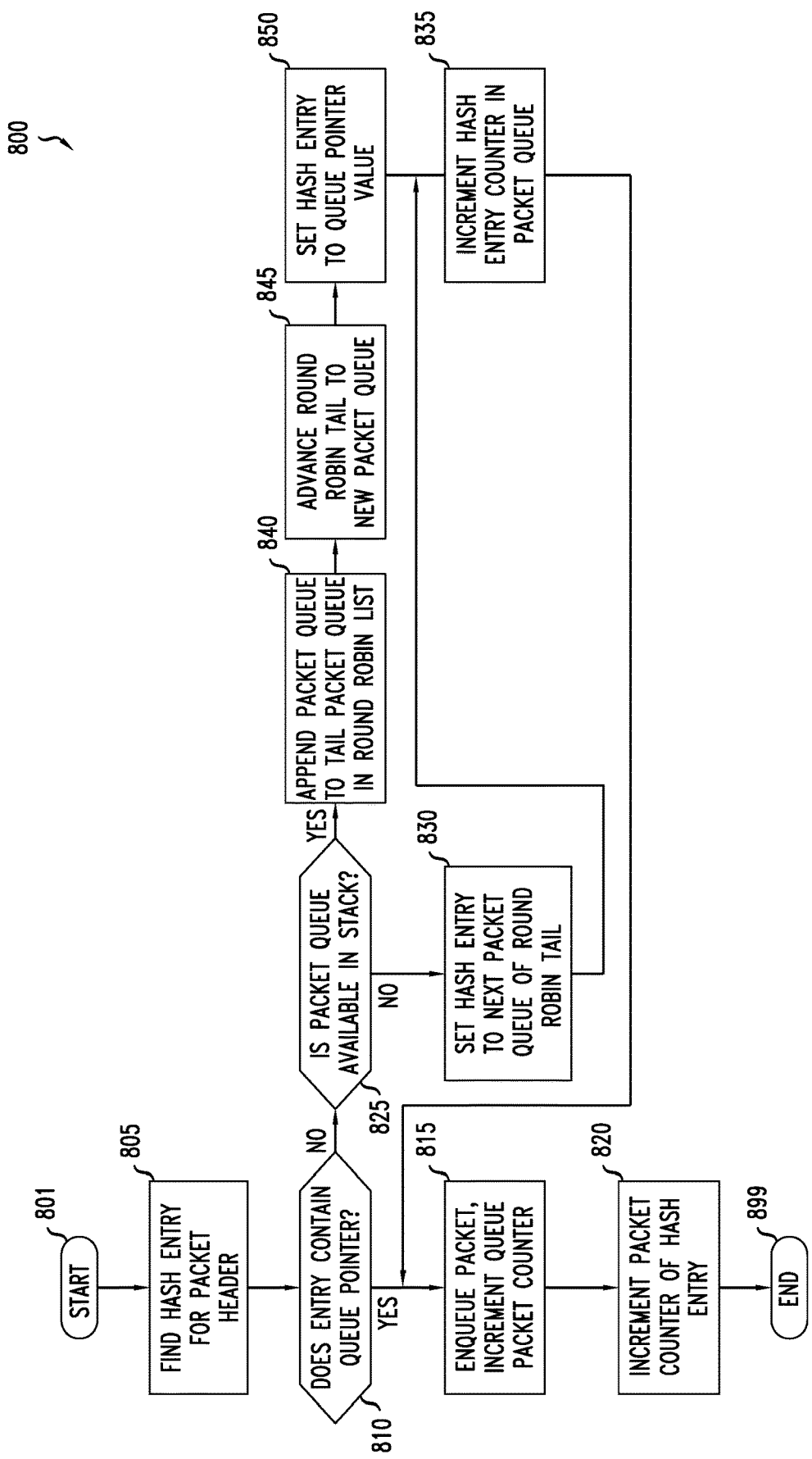
FIG. 8 depicts an example embodiment of a method for handling a packet arrival event, based on a packet queuing memory space including a hash entry space and a packet queue space, where queue collisions of hash entries are mitigated.

FIG. 8 depicts an example embodiment of a method for handling a packet arrival event, based on a packet queuing memory space including a hash entry space and a packet queue space, where queue collisions of hash entries are mitigated. It will be appreciated that, although primarily presented herein as being performed serially, at least a portion of the functions of method 800 may be performed contemporaneously or in a different order than as presented in FIG. 8.

At block 801, method 800 begins.

At block 805, a hash value for the packet header of the arriving packet is identified. The hash value, which may be identified based on application of a hash function to the header or to a portion of the header, points to a hash entry in the hash entry space of the packet queuing memory space. From block 805, method 800 proceeds to block 810.

At block 810, a determination is made as to whether the hash entry for the packet header of the arriving packet includes a queue pointer (which also may be considered to be a determination as to whether a packet queue for the flow with which the arriving packet is associated is currently active). If a determination is made that the hash entry for the packet header of the arriving packet includes a queue pointer (i.e., at least one other packet with the same hash value is currently queued), method 800 proceeds to block 815. If a determination is made that the hash entry for the packet header of the arriving packet does not include a queue pointer (i.e., no other packets with the same hash value are currently queued), method 800 proceeds to block 825.

At block 815, the arriving packet is added to the packet queue pointed to by the queue pointer of the hash entry for the packet header of the arriving packet. The packet counter of the packet queue is incremented to reflect the addition of the arriving packet to the packet queue.

From block 815, method 800 proceeds to block 820.

At block 820, the packet counter of the hash entry for the packet header of the arriving packet (which is an additional counter configured for use in mitigating queue collisions of hash entries) is incremented. From block 820, method 800 proceeds to block 899, where method 800 ends.

At block 825, a determination is made as to whether a packet queue is available for supporting queuing of the arriving packet. This may be a determination as to whether an available packet queue is available in a set of available packet queues in the packet queue space of the packet queuing memory space. If a determination is made that a packet queue is not available for supporting queuing of the arriving packet (e.g., the stack of available packet queues is empty), method 800 proceeds to block 830. If a determination is made that a packet queue is available for supporting queuing of the arriving packet (e.g., the stack of available packet queues is not empty), method 800 proceeds to block 840.

At block 830, the hash entry for the packet header of the arriving packet is set to the queue pointer of the active packet queue that is pointed to by the next queue pointer of the packet queue that is currently pointed to by the round robin tail pointer of the scheduler. From block 830, method 800 proceeds to block 835.

At block 835, the hash entry counter of the active packet queue that is selected for the arriving packet (which is an additional counter configured for use in mitigating queue collisions of hash entries) is incremented. This indicates that an additional hash entry is being supported by the active packet queue. From block 835, method 800 proceeds to block 815.

At block 840, the packet queue that is available for the arriving packet is moved from the set of available packet queues to being associated with the scheduler as a new packet queue associated with the scheduler for the arriving packet. The new packet queue may be the top queue in a stack of available packet queues when the available packet queues are maintained using a stack. The new packet queue is moved to the end of the list of active packet queues associated with the scheduler, next to the packet queue pointed to by the round robin tail pointer of the scheduler (e.g., by setting the next queue pointer of the packet queue currently pointed to by the round robin tail pointer so that it points to the new packet queue). From block 840, method 800 proceeds to block 845.

At block 845, the round robin tail pointer of the scheduler is set to point to the new packet queue, so that the new packet queue becomes the new tail of the list of active packet queues associated with the scheduler. From block 845, method 800 proceeds to block 850.

At block 850, the hash entry for the packet header of the arriving packet is set to the queue pointer of the packet queue for the arriving packet. From block 850, method 800 proceeds to block 835 (at which point the hash entry counter of the active packet queue that is selected for the arriving packet is incremented) and then, as previously indicated, to block 815.

At block 899, method 800 ends.

Figure 9:
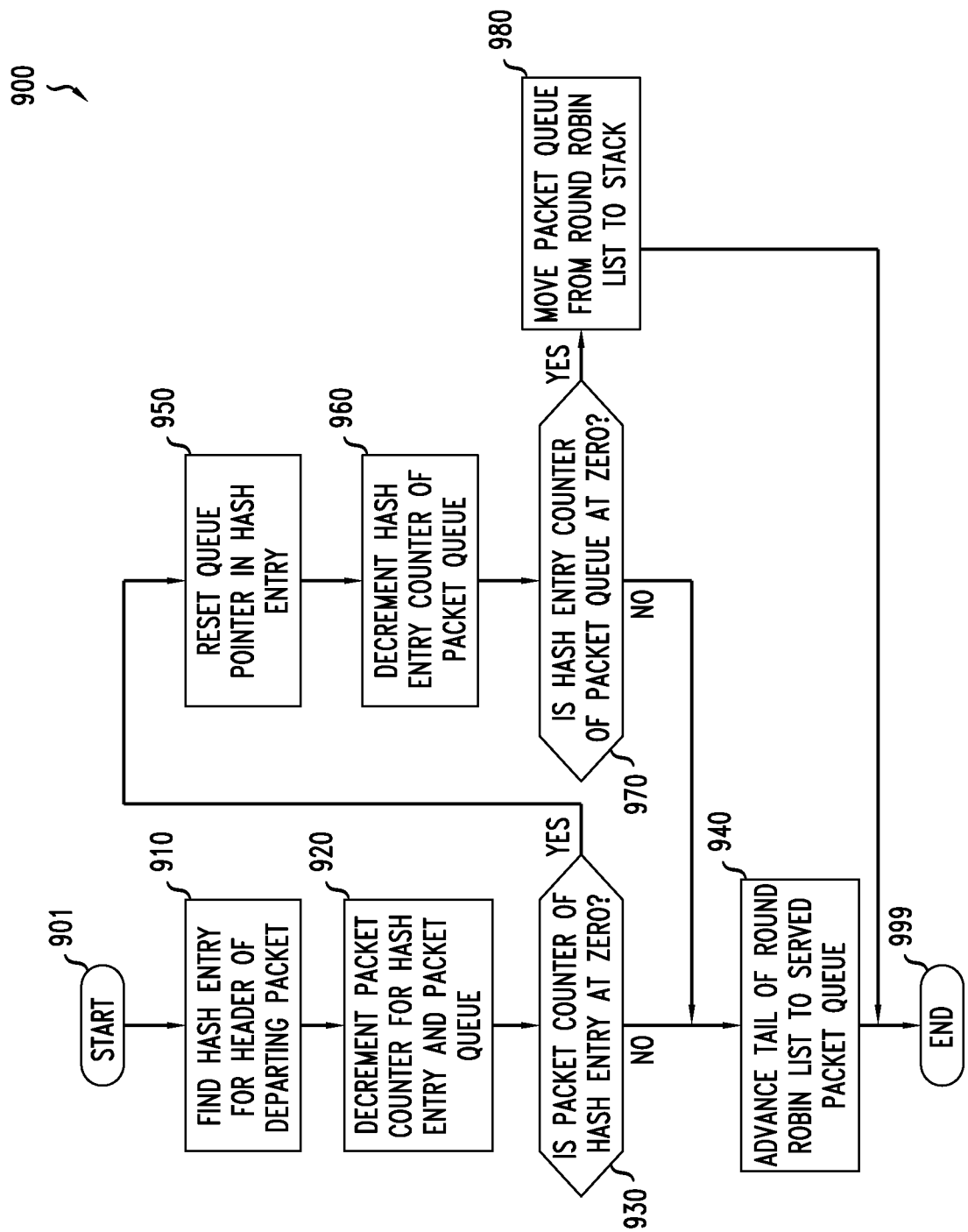
FIG. 9 depicts an example embodiment of a method for handling a packet departure event, based on a packet queuing memory space including a hash entry space and a packet queue space, where queue collisions of hash entries are mitigated.

FIG. 9 depicts an example embodiment of a method for handling a packet departure event, based on a packet queuing memory space including a hash entry space and a packet queue space, where queue collisions of hash entries are mitigated. It will be appreciated that, although primarily presented herein as being performed serially, at least a portion of the functions of method 900 may be performed contemporaneously or in a different order than as presented in FIG. 9.

At block 901, method 900 begins.

At block 910, the hash value for the packet header of the departing packet is identified. The hash value, which may be identified based on application of a hash function to the header or a portion of the header, points to one hash entry in the hash entry space of the packet queuing memory space. From block 910, method 900 proceeds to block 920.

At block 920, the packet counter in the hash entry for the packet header of the departing packet (which is an additional counter configured for use in mitigating queue collisions of hash entries) is decremented and the packet counter of the packet queue of the departing packet is decremented. From block 920, method 900 proceeds to block 930.

At block 930, a determination is made as to whether the packet counter in the hash entry for the packet header of the departing packet is zero. If a determination is made that the packet counter in the hash entry for the packet header of the departing packet is not zero, method 900 proceeds to block 940. If a determination is made that the packet counter in the hash entry for the packet header of the departing packet is zero, method 900 proceeds to block 950.

At block 940, the tail of the list of active packet queues associated with the scheduler is advanced to the packet queue of the departing packet. From block 940, method 900 proceeds to block 999, where method 900 ends.

At block 950, the hash entry for the packet header of the departing packet is reset. The hash entry for the packet header of the departing packet is reset by changing the queue pointer of the hash entry from the value of the packet queue from which the packet was extracted by the scheduler to a value indicative that the hash entry is not currently associated with an active packet queue (e.g., NULL). From block 950, method 900 proceeds to block 960.

At block 960, the hash entry counter of the packet queue of the departing packet (which is an additional counter configured for use in mitigating hash collisions) is decremented. From block 960, method 900 proceeds to block 970.

At block 970, a determination is made as to whether the hash entry counter of the packet queue of the departing packet is zero. If a determination is made that the hash entry counter of the packet queue of the departing packet is not zero, method 900 proceeds to block 940. If a determination is made that the hash entry counter of the packet queue of the departing packet is zero, method 900 proceeds to block 980.

At block 980, the packet queue from which the packet was extracted by the scheduler is moved from being associated with the scheduler (e.g., in the set of active packet queues) to no longer being associated with the scheduler (e.g., in the set of available packet queues). The packet queue may be pushed onto the top of a stack of available packet queues when the available packet queues are maintained using a stack. From block 980, method 900 proceeds to block 999.

At block 999, method 900 ends.

Various embodiments for supporting queuing of packets in a communication network based on a packet queuing memory space including more hash entries than packet queues may provide various advantages or potential advantages. For example, various embodiments for supporting queuing of packets in a communication network based on a packet queuing memory space including more hash entries than packet queues may enable an increase in the number of hash values supported, without increasing the size of the memory, based on a reduction in the number of packet queues supported (and, as long as the expected number of concurrently active flows does not exceed the available queues, then a net benefit in terms of reduction of collision probability may be achieved at a very marginal added cost in the operation of the packet queuing system). For example, various embodiments for supporting queuing of packets in a communication network based on a packet queuing memory space including more hash entries than packet queues may obviate the need to employ various techniques for reducing the probability of hash collisions (e.g., set-associative hashing, probing, chaining, or the like) where such techniques may not be desirable (e.g., they may slow down the mapping function and, thus, may not guarantee the completion of every packet enqueuer and dequeuer operation within a fixed amount of time) in certain high-speed applications of SFQ (e.g., in data center switches). For example, various embodiments for supporting queuing of packets in a communication network based on a packet queuing memory space including more hash entries than packet queues may be configured to prevent saturation of the set of available packet queues (e.g., packets of flows that do not have an associated queue may be dropped upon arrival, packets of flows that do not have an associated queue upon arrival may be mapped onto one of the queues currently associated with other flows where the queue selected for the association may be the next in line for service by the round-robin scheduler for simplicity of identification and better fairness), or the like. Various embodiments for supporting queuing of packets in a communication network based on a packet queuing memory space including more hash entries than packet queues may provide various other advantages or potential advantages.

Figure 10:
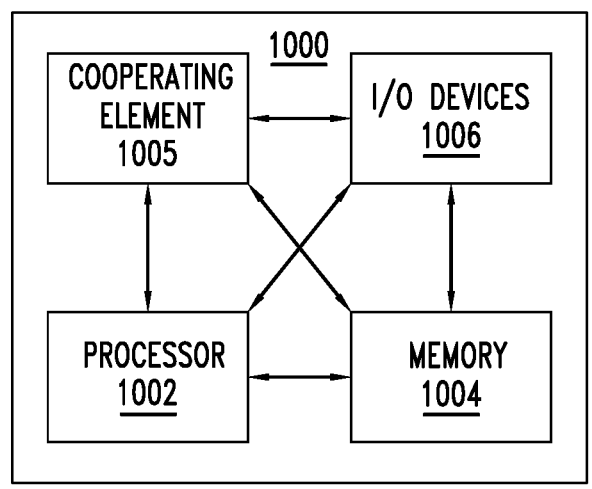
FIG. 10 depicts a high-level block diagram of a computer suitable for use in performing various functions presented herein.

FIG. 10 depicts a high-level block diagram of a computer suitable for use in performing various functions described herein.

The computer 1000 includes a processor 1002 (e.g., a central processing unit (CPU), a processor having a set of one or more processor cores, or the like) and a memory 1004 (e.g., a random-access memory (RAM), a read-only memory (ROM), or the like). The processor 1002 and the memory 1004 are communicatively connected.

The computer 1000 also may include a cooperating element 1005. The cooperating element 1005 may be a hardware device. The cooperating element 1005 may be a process that can be loaded into the memory 1004 and executed by the processor 1002 to implement functions as discussed herein (in which case, for example, the cooperating element 1005 (including associated data structures) can be stored on a non-transitory computer-readable storage medium, such as a storage device or other storage element (e.g., a magnetic drive, an optical drive, or the like)).

The computer 1000 also may include one or more input/output devices 1006. The input/output devices 1006 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices or elements (e.g., a tape drive, a floppy drive, a hard disk drive, a compact disk drive, or the like), or the like, as well as various combinations thereof.

It will be appreciated that computer 1000 of FIG. 10 may represent a general architecture and functionality suitable for implementing functional elements described herein, portions of functional elements described herein, or the like, as well as various combinations thereof. For example, computer 1000 may provide a general architecture and functionality that is suitable for implementing communication device 100 or a portion thereof, buffer 110 or a portion thereof, buffer manager 120 or a portion thereof, scheduler 140 or a portion thereof, or the like.

It will be appreciated that various functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that various functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including computer program code;
   wherein the at least one memory and the computer program code are configured to, with the at least one processor, cause the apparatus to at least:
   handle a packet of a flow based on a packet queuing memory space including a hash entry space configured to maintain a set of H hash entries and a packet queue space configured to maintain a set of Q packet queues, wherein H is greater than Q, wherein a subset of the hash entries in the hash entry space point to ones of the packet queues in the packet queue space and a subset of the hash entries in the hash entry space do not point to ones of the packet queues in the packet queue space, wherein each of the packet queues in the packet queue space that is queuing at least one packet belongs to a set of active queues and is pointed to by a respective one of the hash entries in the hash entry space and each of the packet queues in the packet queue space that is not queuing any packets belongs to a set of available packet queues and is not pointed to by any of the hash entries in the hash entry space.

2. The apparatus of claim 1, wherein the packet is handled based on a hash function configured to hash the packet into one of the hash entries of the hash entry space.

3. The apparatus of claim 1, wherein a number hash entries in the subset of hash entries in the hash entry space which do not point to ones of the packet queues in the packet queue space is larger than a number of packet queues in the set of available packet queues.

4. The apparatus of claim 1, wherein a number hash entries in the subset of hash entries in the hash entry space which do not point to ones of the packet queues in the packet queue space is larger than a number of packet queues in the set of active packet queues.

5. The apparatus of claim 1, wherein, for each packet queue in the set of active packet queues, the hash entry associated with the respective packet queue includes a pointer to the respective packet queue.

6. The apparatus of claim 1, wherein, for each packet queue in the set of active packet queues, the respective packet queue includes a respective data structure including a head packet pointer, a tail packet pointer, a packet counter, and a next queue pointer.

7. The apparatus of claim 1, wherein the packet is handled based on a scheduler configured to service ones of the packet queues in the set of active packet queues and configured to manage ones of the packet queues in the set of available packet queues.

8. The apparatus of claim 7, wherein the scheduler is a round robin scheduler.

9. The apparatus of claim 7, wherein the set of active packet queues is maintained as a linked list.

10. The apparatus of claim 7, wherein the set of available packet queues is maintained using a last-in-first-out (LIFO) queue.

11. The apparatus of claim 7, wherein the scheduler is configured to transition ones of the packet queues between being included in the set of active packet queues and being included in the set of available packet queues based on packet events.

12. The apparatus of claim 1, wherein the at least one memory and the computer program code are configured to, with the at least one processor, cause the apparatus to at least:
   identify, from the hash entry space, a hash entry associated with the packet; and
   based on a determination that the hash entry includes a pointer to one of the active packet queues, add the packet to the one of the active packet queues.

13. The apparatus of claim 1, wherein the at least one memory and the computer program code are configured to, with the at least one processor, cause the apparatus to at least:

identify, from the hash entry space, a hash entry associated with the packet; and based on a determination that the hash entry is empty, drop the packet based on a determination that the set of available packet queues is empty.

14. The apparatus of claim 1, wherein the at least one memory and the computer program code are configured to, with the at least one processor, cause the apparatus to at least:

identify, from the hash entry space, a hash entry associated with the packet;

determine, based on a determination that the hash entry is empty, whether at least one available packet queue is available in the set of available packet queues; and based on a determination that at least one available packet queue is available in the set of available packet queues:
add one of the packet queues from the set of available packet queues to the set of active packet queues;
set the hash entry to point to the one of the packet queues; and
enqueue the packet and increment a packet counter of the one of the packet queues.

15. The apparatus of claim 1, wherein the at least one memory and the computer program code are configured to, with the at least one processor, cause the apparatus to at least:

update a packet counter of a packet queue of the packet; and based on a determination that the packet counter of the packet queue of the packet is indicative that the packet queue is not empty, keep the packet queue of the packet in the set of active packet queues.

16. The apparatus of claim 1, wherein the at least one memory and the computer program code are configured to, with the at least one processor, cause the apparatus to at least:

update a packet counter of a packet queue of the packet; and based on a determination that the packet counter of the packet queue of the packet is indicative that the packet queue is empty:
identify a hash entry associated with the packet queue of the packet;
reset the hash entry associated with the packet queue of the packet; and
move the packet queue of the packet from the set of active packet queues to the set of available packet queues.

17. The apparatus of claim 1, wherein the at least one memory and the computer program code are configured to, with the at least one processor, cause the apparatus to at least:

identify, from the hash entry space, a hash entry associated with the packet; and based on a determination that the hash entry includes a pointer to one of the active packet queues:
enqueue the packet;
increment a packet counter of the one of the active packet queues; and
increment a packet counter of the hash entry associated with the packet.

18. The apparatus of claim 1, wherein the at least one memory and the computer program code are configured to, with the at least one processor, cause the apparatus to at least:

identify, from the hash entry space, a hash entry associated with the packet;

based on a determination that the hash entry is empty, determine whether the set of available packet queues is empty; and based on a determination that the set of available packet queues is empty:
set the hash entry associated with the packet to a next packet queue of the set of active packet queues;
increment a hash entry counter of the next packet queue;
enqueue the packet;
increment a packet counter of the next packet queue; and
increment a packet counter of the hash entry associated with the packet.

19. The apparatus of claim 1, wherein the at least one memory and the computer program code are configured to, with the at least one processor, cause the apparatus to at least:

identify, from the hash entry space, a hash entry associated with the packet;

based on a determination that the hash entry is empty, determine whether at least one available packet queue is available in the set of available packet queues; and based on a determination that at least one available packet queue is available in the set of available packet queues:
add one of the packet queues from the set of available packet queues to the set of active packet queues;
set the hash entry to point to the one of the packet queues;
increment a hash entry counter of the one of the packet queues;
enqueue the packet and increment a packet counter of the one of the packet queues; and
increment a packet counter of the hash entry associated with the packet.

20. The apparatus of claim 1, wherein the at least one memory and the computer program code are configured to, with the at least one processor, cause the apparatus to at least:

identify, from the hash entry space, a hash entry associated with the packet;

update a packet counter of a packet queue of the packet and a packet counter of the hash entry associated with the packet; and based on a determination that the packet counter of the hash entry associated with the packet is indicative that the hash entry associated with the packet is not empty, keep the packet queue of the packet in the set of active packet queues.

21. The apparatus of claim 1, wherein the at least one memory and the computer program code are configured to, with the at least one processor, cause the apparatus to at least:

identify, from the hash entry space, a hash entry associated with the packet;

update a packet counter of a packet queue of the packet and a packet counter of the hash entry associated with the packet; and based on a determination that the packet counter of the hash entry associated with the packet is indicative that the hash entry associated with the packet is empty:
reset a queue pointer in the hash entry associated with the packet;
update a hash entry counter of the packet queue of the packet; and
based on a determination that the flow counter of the packet queue of the packet is indicative that the packet queue of the packet is not empty, keep the packet queue of the packet in the set of active packet queues.

22. The apparatus of claim 1, wherein the at least one memory and the computer program code are configured to, with the at least one processor, cause the apparatus to at least:
identify, from the hash entry space, a hash entry associated with the packet;
update a packet counter of a packet queue of the packet and a packet counter of the hash entry associated with the packet; and
based on a determination that the packet counter of the hash entry associated with the packet is indicative that the hash entry associated with the packet is empty:
reset a queue pointer in the hash entry associated with the packet;
update a hash entry counter of the packet queue of the packet; and
based on a determination that the hash entry counter of the packet queue of the packet is indicative that the packet queue of the packet is empty, move the packet queue of the packet from the set of active packet queues to the set of available packet queues.

23. A non-transitory computer-readable storage medium comprising instructions configured to cause an apparatus to at least:
handle a packet of a flow based on a packet queuing memory space including a hash entry space configured to maintain a set of H hash entries and a packet queue space configured to maintain a set of Q packet queues, wherein H is greater than Q, wherein a subset of the hash entries in the hash entry space point to ones of the packet queues in the packet queue space and a subset of the hash entries in the hash entry space do not point to ones of the packet queues in the packet queue space, wherein each of the packet queues in the packet queue space that is queuing at least one packet belongs to a set of active queues and is pointed to by a respective one of the hash entries in the hash entry space and each of the packet queues in the packet queue space that is not queuing any packets belongs to a set of available packet queues and is not pointed to by any of the hash entries in the hash entry space.

24. A method, comprising:
handling, at an apparatus, a packet of a flow based on a packet queuing memory space including a hash entry space configured to maintain a set of H hash entries and a packet queue space configured to maintain a set of Q packet queues, wherein H is greater than Q, wherein a subset of the hash entries in the hash entry space point to ones of the packet queues in the packet queue space and a subset of the hash entries in the hash entry space do not point to ones of the packet queues in the packet queue space, wherein each of the packet queues in the packet queue space that is queuing at least one packet belongs to a set of active queues and is pointed to by a respective one of the hash entries in the hash entry space and each of the packet queues in the packet queue space that is not queuing any packets belongs to a set of available packet queues and is not pointed to by any of the hash entries in the hash entry space.

25. An apparatus, comprising:
a memory configured to provide a packet queuing memory space including a hash entry space configured to maintain a set of H hash entries and a packet queue space configured to maintain a set of Q packet queues, wherein H is greater than Q, wherein a subset of the hash entries in the hash entry space point to ones of the packet queues in the packet queue space and wherein the number of the subset of hash entries in the hash entry space which do not point to ones of the packet queues in the packet queue space is larger than the number of packet queues remaining to be used in the packet queue space; and
a processor configured to handle queuing and dequeuing of packets using the packet queuing memory space.

* * * * *

UNITED STATES PATENT AND TRADEMARK OFFICE
CERTIFICATE OF CORRECTION

| | | |
|---|---|---|
| PATENT NO. | : 11,240,169 B2 | Page 1 of 1 |
| APPLICATION NO. | : 16/051097 | |
| DATED | : February 1, 2022 | |
| INVENTOR(S) | : Andrea Francini and Sameerkumar Sharma | |

It is certified that error appears in the above-identified patent and that said Letters Patent is hereby corrected as shown below:

In the Claims

Column 28, Line 19, Claim 3, after "number" insert -- of --
Column 28, Line 24, Claim 4, after "number" insert -- of --

Signed and Sealed this
Twenty-fifth Day of April, 2023

Katherine Kelly Vidal
*Director of the United States Patent and Trademark Office*